(12) United States Patent
Edwards

(10) Patent No.: US 7,359,085 B2
(45) Date of Patent: Apr. 15, 2008

(54) METHOD AND APPARATUS FOR RECORDING SOUND INFORMATION AND PLAYING SOUND INFORMATION BACK USING AN ALL-IN-ONE PRINTER

(75) Inventor: Mark Joseph Edwards, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 979 days.

(21) Appl. No.: 10/619,239

(22) Filed: Jul. 14, 2003

(65) Prior Publication Data

US 2005/0012955 A1 Jan. 20, 2005

(51) Int. Cl.
*G06F 15/00* (2006.01)
*G06F 3/12* (2006.01)
*G10L 15/26* (2006.01)

(52) U.S. Cl. .............. 358/1.18; 358/1.16; 358/1.17; 358/1.1; 358/1.2; 358/474; 358/439; 704/235

(58) Field of Classification Search ............ None
See application file for complete search history.

(56) References Cited

U.S. PATENT DOCUMENTS

| | | | |
|---|---|---|---|
| 4,996,707 A | 2/1991 | O'Malley et al. | |
| 5,282,242 A | 1/1994 | Hachinoda | |
| 5,574,571 A | 11/1996 | Charbonnier | |
| 5,715,370 A | 2/1998 | Luther et al. | |
| 5,798,848 A | 8/1998 | Ouchi | |
| 5,850,629 A | 12/1998 | Holm et al. | |
| 5,898,423 A | 4/1999 | Tognazzini et al. | |
| 5,970,123 A | 10/1999 | Kong | |
| 6,031,637 A | 2/2000 | Shibata et al. | |
| 6,043,899 A * | 3/2000 | Morohashi et al. | 358/1.18 |
| 6,052,663 A | 4/2000 | Kurzweil et al. | |
| 6,076,060 A | 6/2000 | Lin et al. | |
| 6,115,482 A | 9/2000 | Sears et al. | |
| 6,154,291 A | 11/2000 | Asai | |
| 6,185,329 B1 | 2/2001 | Zhang et al. | |
| 6,218,964 B1 | 4/2001 | Ellis | |
| 6,272,357 B1 | 8/2001 | Park | |
| 6,282,504 B1 | 8/2001 | Wong et al. | |
| 6,289,304 B1 | 9/2001 | Grefenstette | |
| 6,441,921 B1 * | 8/2002 | Soscia | 358/1.9 |
| 6,552,825 B1 * | 4/2003 | Doi et al. | 358/404 |
| 6,615,173 B1 | 9/2003 | Celi, Jr. | |
| 2003/0059088 A1 | 3/2003 | Culp et al. | |
| 2003/0072013 A1 * | 4/2003 | Norris et al. | 358/1.1 |
| 2003/0089777 A1 * | 5/2003 | Rajasekharan et al. | 235/454 |
| 2003/0163316 A1 | 8/2003 | Addison et al. | |
| 2003/0195749 A1 | 10/2003 | Schuller | |
| 2006/0023251 A1 * | 2/2006 | Petteruti et al. | 358/1.15 |

* cited by examiner

*Primary Examiner*—Twyler Lamb Haskins
*Assistant Examiner*—Hilina S Kassa
(74) *Attorney, Agent, or Firm*—Taylor & Aust, PC

(57) ABSTRACT

An all-in-one (AIO) printer is provided, in which its bulk input device (scanner) is employed as a data reader of audio information, and its bulk output device (print engine/printhead) is employed as a data burner (or writer) of audio information. The present invention acts as a sound recording device and a sound playback device that may be incorporated within an AIO printer. If the AIO printer is combined with a host computer that includes a microphone and speakers, then no physical hardware need be added to a standard AIO printer to perform the functions of the present invention of recording and storing audio information.

17 Claims, 12 Drawing Sheets

METHOD AND APPARATUS FOR RECORDING SOUND INFORMATION AND PLAYING SOUND INFORMATION BACK USING AN ALL-IN-ONE PRINTER

TECHNICAL FIELD

The present invention relates generally to image forming equipment and is particularly directed to a printing and scanning apparatus of the type which can receive audio data from an optical scanner, or from a microphone, and can playback stored audio information to a speaker, or reproduce it in the form of a print job. The invention is specifically disclosed as an all-in-one printer that scans an image from a sheet of print media, determines if a portion, or all, of the scanned input data represents audio information, and stores that audio information in a compressed format; it also can receive audio information from a microphone, digitize that signal, and store that audio information in a compressed format; it also can retrieve an audio information data file, uncompress it and run it through a DAC to generate an analog audio signal, and present that signal to a speaker; finally it also can retrieve an audio information data file, uncompress it and create a bitmap representation of that audio information, then print the audio information onto a sheet of print media. The input functions are in two forms: a microphone input and an optical scanner input (from a hard-copy sheet of media). The output functions also are in two forms: a printed (hard-copy) output and a speaker playback. One form of an optical scanner used in the present invention is the auto-alignment sensor mounted on the printhead carrier of an ink jet printer.

BACKGROUND OF THE INVENTION

Photographs or other visual presentations have been combined with audio playback presentation units in the past, and one device used as a viewing device for children was known as the VIEWMASTER™. In one version of the VIEWMASTER, the image could be viewed by the user while an audio track was played, which was stored on the VIEWMASTER disk by some type of magnetic media, for example.

One refinement of this type of device has been disclosed in U.S. Pat. No. 5,878,292 (by Bell), which is owned by Eastman Kodak Company. This Bell patent describes an image-audio photographic print that contains image information on the front side of the print media, and an accessible audio data storage means on the back side of the media. The audio data storage device was described as being an EEPROM, or perhaps a solid state floppy disc card known as an "SSFDC," manufactured by Toshiba. In other words, the audio data was stored in a randomly accessible non-volatile memory, positioned in a recess on the reverse side of the print media. A "player" was used to record the audio information into the data storage means, and then to copy audio information, potentially from one print to another. The audio data storage device was positioned to be in electrical contact with the player apparatus.

A more recent image presentation device with audio information stored thereon is disclosed in U.S. Pat. No. 6,322,181 (by Silverbrook), owned by Silverbrook Research Pty Ltd. This Silverbrook patent is described as being a camera system that includes a digital audio message recording capability on photographs. A printer can be used for printing an image on a first area of the print media that is supplied with the camera system, and an encoded version of an audio signal can be printed on a second area of the print media. Preferably the image is printed on a first surface while the encoded version of the audio information is printed on a second surface (i.e., the reverse side) of the print media. The print media can be supplied in the camera system on a detachable print roll, and the printer can include a first ink jet printhead that prints the image, and also a second printhead that prints the encoded version of the audio information. The printer means includes a page width printhead for printing the image on a first area of the print media, and also for printing the fault tolerant encoded digital version of the audio information on a second area of the print media. The overall camera system that makes up the Silverbrook invention comprises a portable hand held unit that images scenes by an image sensor means (i.e., some type of optical scanner) and can then print the scenes directly out of the camera system via the printer device. When it is desired to play back the recorded audio information, the photograph (i.e., the imaged print media) is passed through a reader device that includes a set of pinch rollers that can "pinch roll" the photograph passing through a linear CCD (capacitively-coupled charge device) sensing device.

While the Bell and Silverbrook patents describe interesting devices, neither of those inventions describes an apparatus that can print audio information on standard sheet print media, such as a standard laser printer or a standard ink jet printer that prints on an 8 ½×11 inch sheet of paper. Moreover, both of these prior art devices describe placing the image information on one side of the print media, while the audio information is placed on the opposite or reverse side of the print media. Finally, both the Bell and Silverbrook devices require a specialized reader, and it would be an improvement to be able to use a standard optical scanner that is readily available for scanning standard sheet print media, including optical scanners found on "all-in-one" printers, which can detect audio information on that standard sheet print media, or an auto-alignment sensor of an ink jet printer that can detect infrared-readable (IR-readable) inks or toner.

SUMMARY OF THE INVENTION

Accordingly, it is an advantage of the present invention to provide a printing device that is capable of printing image information and a representation of audio information on the same surface of a sheet of print media.

It is another advantage of the present invention to provide a printing device capable of printing both image data and the representation of audio data on a single side of print media using a "standard" printing device, such as a laser printer or an ink jet printer capable of printing on standard letter-sized sheet paper.

It is a further advantage of the present invention to provide a printing apparatus that prints both image data and a representation of audio information on print media, in which the audio information is printed in a format, such as a yellow color or a "light" shade of another color (including black), that can be placed proximal to the image information on the print media, in a manner that does not obtrusively or significantly detract from the image presentation, yet can be scanned and played back; both visible inks and non-visible inks (to a human eye) can be used for this purpose.

It is yet another advantage of the present invention to provide a printer/scanner unit that is capable of printing both image data and a representation of audio information on print media, and also is capable of scanning such information so as to reproduce the image data and to play back the audio information in the form of an audio electrical signal, or as sound waves.

It is still another advantage of the present invention to provide an all-in-one (AIO) printer that can both scan and print image information, and which can both scan and play back audio information, by the addition of only minor components to a standard AIO printer, such as a built-in microphone and a built-in speaker unit with audio amplifier.

It is yet a further advantage of the present invention to provide an all-in-one (AIO) printer that is interfaced with a host computer (such as a PC), in which the AIO printer is capable of both printing and scanning both image information and audio information on print media, but requires no further additional hardware components, and instead utilizes the microphone and speaker(s) on the host computer for both recording and playing back the audio information.

It is still a further advantage of the present invention to provide a sound recording and image forming system that uses a microphone to capture sound waves (audio information) and convert those into an electrical signal, which is later converted into a data signal (in a digital format) and yet later converted into a print job that is transferred to a print engine for recording as a hard-copy printout, in which at least a portion of the hard-copy printout is representative of the sound waves captured by the microphone.

It is yet another advantage of the present invention to provide an image scanning and sound playback system that scans a hard-copy image (using an optical scanner) and converts the scanned image data into a set of audio information (from at least a portion of the hard-copy image data), and directs the audio information through an interface circuit that drives an audio speaker, so that a user can play back and listen to the audio information.

It is still another advantage of the present invention to provide an image scanning and image forming apparatus that uses a optical sensor mounted on a printhead carrier that scans the hard-copy image data that already exists on a sheet of print media, and detects audio information included in that hard-copy image data as input audio data, in which the audio information is formed by a non-visible (to humans) ink or toner, and manipulates the input audio data so as: (1) to store this data for later use, (2) to print this data in its initial form or in an appended form, or (3) to play back this data through an interface circuit that drives an audio speaker, in which the speaker is resident either on the image scanning and image forming apparatus, or on a computer connected to the image scanning and image forming apparatus.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an image forming and image scanning apparatus is provided, which comprises: an optical scanner that produces a first data signal from a hard-copy image; a memory circuit for storage of data; a communications port; a print engine that produces a physical output upon a print media; and at least one processing circuit that is configured to control a flow of data: (a) between the memory circuit and the communications port, (b) between the optical scanner and the memory circuit, and (c) between the print engine and the memory circuit; the at least one processing circuit also being configured: (d) to convert the first data signal produced by the optical scanner into a second data signal, at least a portion of which is in an audio information format, then (e) to transfer the second data signal to the communications port; and the at least one processing circuit further being configured: (f) to receive a third data signal from the communications port, at least a portion of third data signal having an audio information format, (g) to convert the third data signal into a fourth data signal comprising a print job format, then (h) to transfer the fourth data signal to the print engine for recording as a hard-copy printout upon a print media, wherein the fourth data signal contains audio information for at least a portion of the hard-copy printout.

In accordance with another aspect of the present invention, an image forming and image scanning apparatus is provided, which comprises: an optical scanner; a memory circuit for storage of data; a print engine; a microphone; an input interface circuit; an output interface circuit; an audio speaker that outputs sounds waves; and at least one processing circuit that is configured to control a flow of data: (a) between the optical scanner and the memory circuit, (b) to the output interface circuit, (c) from the input interface circuit, and (d) between the print engine and the memory circuit; wherein: the optical scanner produces a first data signal from a hard-copy image; the at least one processing circuit is also configured: (e) to convert the first data signal produced by the optical scanner into the a second data signal, at least a portion of which is in an audio information format, (d) to transfer the second data signal to the output interface circuit; the output interface circuit converts at least a portion of the second data signal into a fifth signal that drives the audio speaker; the microphone generates an audio-frequency signal from received sound waves; the input interface circuit converts the audio-frequency signal generated by the microphone into at least a portion of a third data signal; the at least one processing circuit is further configured: (e) to receive the third data signal from the input interface circuit, at least a portion of third data signal having an audio information format, (f) to convert the third data signal into a fourth data signal comprising a print job format, then (g) to transfer the fourth data signal to the print engine for recording as a hard-copy printout upon a print media, wherein the fourth data signal contains audio information for at least a portion of the hard-copy printout.

In accordance with yet another aspect of the present invention, a method for recording, sound waves and for playing back sound waves is provided, utilizing an image forming and scanning apparatus, in which the method comprises the following steps: receiving first sound waves at a microphone, and converting the first sound waves to a first audio information signal; interfacing the first audio information signal to an image forming and scanning apparatus, and recording as at least a portion of a hard-copy printout the first audio information signal in a predetermined format utilizing a printer portion of the image forming and scanning apparatus, wherein the first audio information signal portion of the hard-copy printout is representative of the first sound waves; based upon a hard-copy image, receiving image information from an optical scanner portion of the image forming and scanning apparatus, wherein at least a portion of the image information comprises audio data, and converting the audio data portion of the image information into a second audio information signal; and interfacing the second audio information signal to an audio speaker, and outputting second sound waves, wherein the second sound waves are representative of the audio data portion of the image information received by the optical scanner portion.

In accordance with still another aspect of the present invention, a sound recording and image forming system is provided, which comprises: a memory circuit for storage of data; a print engine; a microphone; an interface circuit; and at least one processing circuit that is configured to control a flow of data: (a) from the interface circuit, and (b) between the print engine and the memory circuit; wherein: the microphone generates an audio-frequency signal from received sound waves; the interface circuit receives and converts the audio-frequency signal generated by the microphone into a first data signal, wherein at least a portion of the first data signal comprises information representative of the received sound waves; and the at least one processing circuit is further configured: (c) to receive the first data signal from the interface circuit, (d) to convert the first data signal into a second data signal comprising a print job, and (e) to transfer the second data signal to the print engine for recording as a hard-copy printout upon a print media, in which at least a portion of the hard-copy printout is representative of the received sound waves.

In accordance with a further aspect of the present invention, an image scanning and sound playback system is provided, which comprises: an optical scanner; a memory circuit for storage of data; an interface circuit; an audio speaker that outputs sounds waves; and at least one processing circuit that is configured to control a flow of data: (a between the optical scanner and the memory circuit, and (b) to the interface circuit; wherein: the optical scanner produces a first data signal from a hard-copy image; the at least one processing circuit is also configured: (c) to convert the first data signal produced by the optical scanner into the a second data signal, at least a portion of which comprises audio information from the hard-copy image, and (d) to transfer the second data signal to the interface circuit; and the interface circuit converts at least a portion of the second data signal into a third signal that drives the audio speaker to play back the audio information.

In accordance with yet a further aspect of the present invention, an image sensing and image forming apparatus is provided, which comprises: an optical sensor; a memory circuit for storage of data; a print engine having a printhead carrier; and at least one processing circuit that is configured to control a flow of data: (a) between the optical sensor and the memory circuit, and (b) between the print engine and the memory circuit; wherein: the optical sensor is mounted on the printhead carrier, the optical sensor producing a first data signal from a hard-copy image, at least a portion of which comprises audio information; and the at least one processing circuit is also configured: (c) to convert the first data signal into a second data signal comprising a print job, and (d) to transfer the second data signal to the print engine for recording as a hard-copy printout upon a print media, wherein at least a portion of the hard-copy printout is representative of the audio information.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
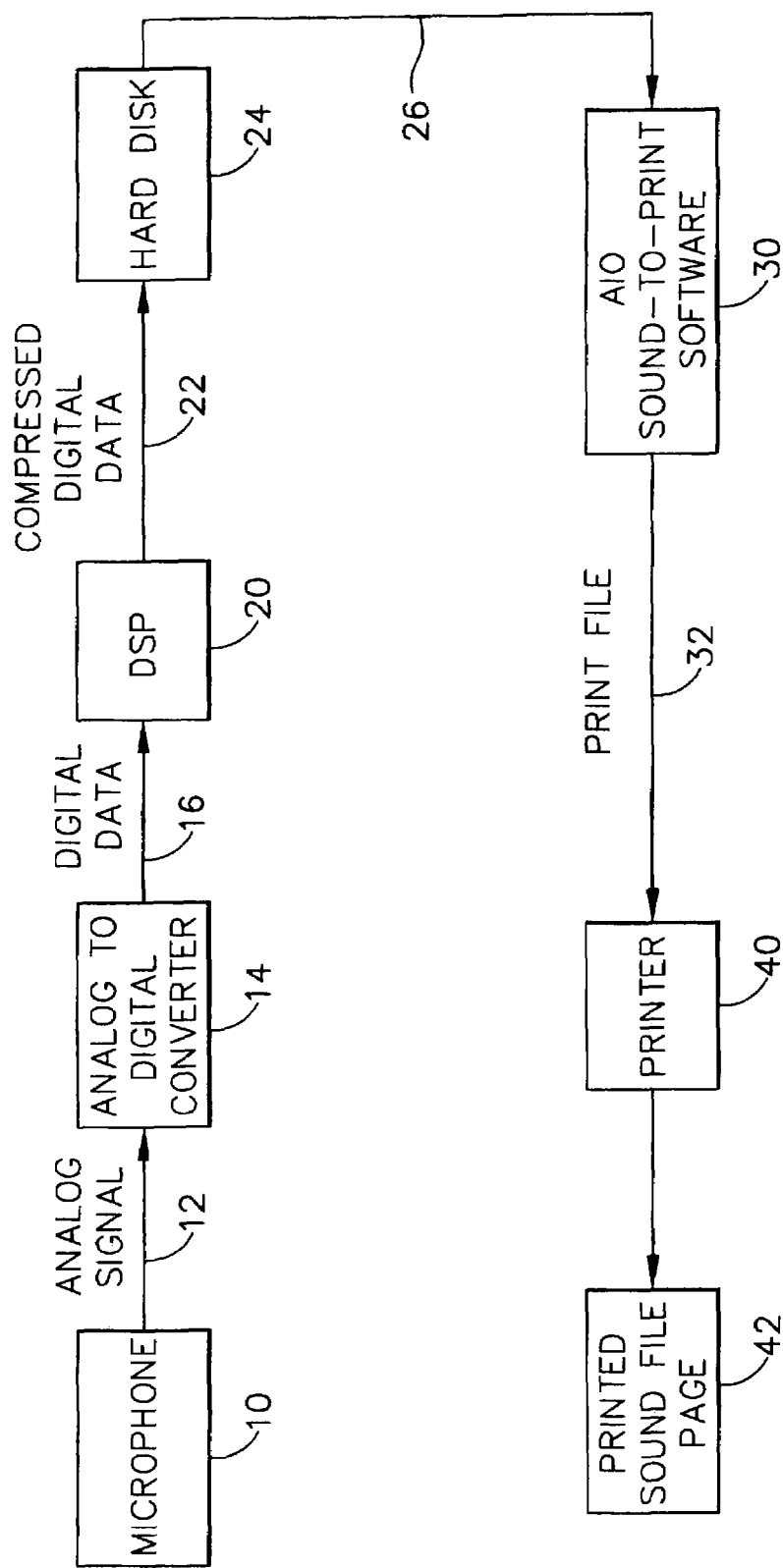
FIG. 1 is a block diagram of some of the important hardware components used to convert audio or sound information into a printed format, as constructed according to the principles of the present invention.

Reference will now be made in detail to the present preferred embodiment of the invention, an example of which is illustrated in the accompanying drawings, wherein like numerals indicate the same elements throughout the views.

All-in-one (AIO) printers include a bulk input device (i.e., the scanner) that may be employed as a data reader. The AIO printer also has a bulk output device (i.e., the print engine, or printhead) that may be employed as a data burner (or writer). In very general terms, the present invention acts as a sound recording device and a sound playback device that may be incorporated within an AIO printer at low cost by employing the resident data reader and data burner (i.e., the scanner and the print engine).

If the AIO printer is combined with a host computer that includes a microphone and speakers, then no physical hardware need be added to a standard AIO printer to perform the functions of the present invention of recording and storing audio information (i.e., by printing on a piece of print media) and to then play back previously stored audio information (i.e., by using the scanner to scan a sheet of print media). On the other hand, the AIO printer can act as a standalone device by adding a microphone and a speaker, which can be fairly inexpensive devices, if desired. Assuming high fidelity sound is not a system requirement, the additional cost of the microphone and speaker plus a small amount of cabling could be quite inexpensive.

As will be described in greater detail below, analog sound information received from a microphone on an AIO printer could be directed through an A/D converter, possibly even the A/D converter that is present to handle the CCD pixel data, thus being turned into digital data. This data could then be compressed with software audio compression routines, and temporarily stored in memory. This data could then be formatted into a standard or a proprietary print pattern and printed onto any sheet of print media, within or without a "standard" print job. The printing of the audio information could be embedded in photographs or other images, for example, and this could be dependent upon a desired implementation, either selectable by the system designer, or perhaps even selectable by a user. A simple approach would be to simply limit the sound length to a predetermined amount of time, and then print the data in a predetermined type of code, including perhaps a relatively standard barcode format. Of course, many other approaches could be taken that would allow more or less data, which could also be somewhat "hidden" in the printed output. For example, a coded pattern of yellow ink dots could represent the audio data, and would be relatively unnoticeable as a section of a text printout along its margin.

The audio data could be printed as a coded pattern on paper that would later be scanned, also by another AIO printer (or the same AIO printer at a later time) with the press, for example, of a "scan-to-audio" operator panel button. The software of the AIO printer would then be used to detect the coded pattern, decompress (uncompress) it, translate the data back into audio information, then convert the digital data into an analog signal, and send the analog audio signal to the speaker. Thus the user could actually hear a recording of someone's voice, or perhaps music information, for example, right off the speaker of the printer (or from the speaker of a host PC that is connected to the printer).

Since many AIO printers are not standalone devices, but instead are designed to operate when attached to a personal computer, then the PC's microphone and speakers could be employed to eliminate the need (and cost) to duplicate these devices within the AIO hardware itself. In addition, the software data translation, compression, decompression, special formatting, scan code detection, and encoding, etc., also may be performed within the host PC software. This would relieve the AIO printing device from having to perform these functions, if desired. The hardware cost of this implementation would be extremely low, and perhaps the only additional hardware would be a new operator panel button to perform a "scan-to-audio" function for example. In this situation, the manufacturing costs to implement the present invention would mainly be represented in software development.

Possible applications for the present invention could include use by a college professor who hands out lecture notes with voice annotations of critical points; or a photograph of a three-year old girl at a birthday party, voice annotated with the girl saying "I'm three years old." Other examples could be Christmas cards in which the sender actually says "Merry Christmas," when the card is scanned and played back on the AIO printer. Of course, many other applications or uses are possible within the scope of the present invention.

Referring now to FIG. 1, the hardware to input sound information and create a printed representation of this sound information is illustrated. This block diagram of FIG. 1 assumes that a host computer, such as a personal computer or workstation, or even a laptop computer is-available and includes a microphone and a sound card. In most PC's, the sound card or sound chipset creates a data file in "WAV" format from the input data that is received from the microphone. The process of converting that data into a file that is to be recorded on a hard disk or other media follows below.

Starting at a microphone 10 mounted on a PC, for example, the sound waves are converted into analog electrical signals that vary in both amplitude and frequency, at 12. This analog waveform signal is processed in real time by an analog to digital converter (ADC) device 14, which outputs a string of binary or digital data at 16. This digital data can comprise either serial information or parallel information, or a combination of both, and in general will include binary logic states sometimes referred to as Logic 1 or Logic 0.

The digital data 16 is now directed to a DSP module or function 20 that compresses the digital data 16 into compressed digital data 22. ("DSP" stands for digital signal processing.) The compressed digital data takes up less space and memory, and this information is now stored on a hard disk drive 24, for example, of the host computer (a PC or workstation, or even a laptop computer, for example). The DSP 20 is programmed by a set of instructions that could be stored on another chip of the sound card of the host computer, and one of the DSP's functions is to compress the digital data. This configuration allows the host computer's processing device (e.g., a microprocessor chip) to perform other tasks while these functions are taking place.

The output signal 22 from the DSP 20 is fed to the computer's data bus by connections on the sound card, or by traces on the PC's motherboard to and from the sound chipset. Once the data is routed to the hard-disk controller, it is stored on the hard disk drive, probably as a WAV file, or perhaps some other data format, if desired. At this point the WAV file may be used directly, or it could be converted into another format, such as MP3 data format. It, is also possible to record directly into the MP3 format, if desired.

The information on the hard disk 24 can now be directed through a set of communications ports 28, over a signal path 26 to an AIO driver 30 that will include "sound-to-print" software. The AIO driver 30 can process a WAY file or MP3 file to produce a print file representation of the audio data contained in the WAV or MP3 file. In a very simplistic approach, Logic 1's and Logic 0's in a "sound file" (containing audio information) may be printed as black bars and spaces, respectively, or black dots and white "dots" respectively. These, may be arranged linearly across the width of a page, and continued on each successive line until all of the sound and data in this representation has been written. Once the print file has been composed by the AIO driver, it will be sent, probably in a serial data format, as a print file or video file 32 to the print engine of a printer 40. The printer can be a standard laser or ink jet printer, or it could be itself an all-in-one (AIO) printer, if desired.

Once the printer receives the print file 32, it can re-format the data into a bitmap, if needed, or if the bitmap was created (by a rasterizing process) in the PC, then the printer can immediately send the data to its print engine, and output the data on a sheet of print media 42. As described above, the sheet of print media can also include other information, such as an image, or even character (text) data, if desired. All of this information can be output onto the same surface of the sheet of print media, if desired. Moreover, the sound data can be somewhat subdued (i.e., made unobtrusive or inobtrusive), or even substantially hidden within the image bitmap data or other information that is printed on the same surface of the print media.

As noted above, in some situations the printed audio information (the "sound file") may be placed upon the print media in a manner that is at least somewhat unobtrusive when viewed by a human eye. This includes situations where the audio data is printed in close proximity to some image data (e.g., actual continuous-tone images, or character/text two-tone information). The unobtrusiveness could be accomplished by using a light color for the audio data, or perhaps by using a black-ink gray level that is substantially "light" as compared to the proximal image. In fact, the audio data could be printed using a special ink or toner that is literally invisible to the human eye, yet is nevertheless visible to some types of "optical scanners."

For example, the optical "scanning" function could be performed by use of an auto-alignment sensor of an ink jet printer, for example. In this type of arrangement, the audio information could be printed using an infrared-readable ink or toner, such as infrared-readable ink described at an Internet website "www.invizicode.com" (manufactured or sold by Videk Corporation of Rochester, N.Y.), or that described at another Internet website "http://www.maxmax.com/aXRayIRInks.asp." In this arrangement, the ink jet printer alone performs both the scanning function and the recording function of the present invention. In other words, a conventional optical scanner (such as a scanbar) would not necessarily be required to perform the function of detecting the audio information on a sheet of print media.

It should be noted that an auto-alignment sensor of the type found in many standard (conventional) Lexmark ink jet printers is capable of detecting reflected light at infrared wavelengths. Such an auto-alignment (or automatic alignment) sensor 252 is illustrated on FIG. 6, which is described below. In conventional Lexmark ink jet printers, the auto-alignment sensor is mounted on the printhead carrier, and has the ability to inspect a printed pattern of the sheet of print media as it passes through the printer. For purposes of the present invention, it would be possible to mount more than one auto-alignment sensor so as to either increase the resolution, or increase the processing "input" speed for inspecting a sheet of print media, if desired. The desired input "scanning" rate would, of course, be up to the printer designer.

Note that the "sound file" that is printed on the sheet of print media 42, with respect to the present invention, represents (at least) audio information in the form of a "hard-copy printout" on that sheet 42. As discussed above, both "sound" (or "audio") information and "image" data may exist on the same surface of the sheet of print media 42; when this occurs, the term "hard-copy printout" may apply to either (or both) the audio information or the image data.

Figure 2:
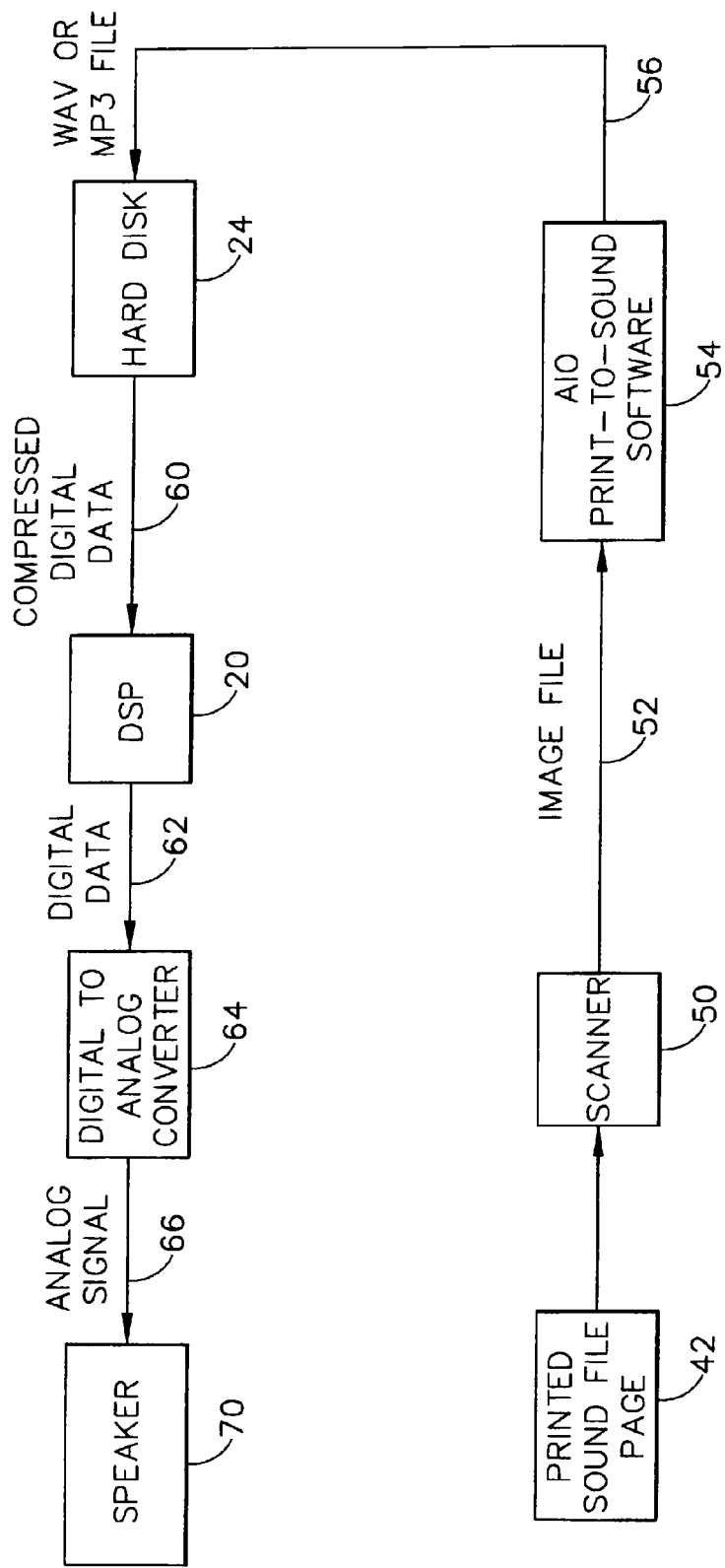
FIG. 2 is a block diagram of some of the important hardware components used to scan audio data information from print media and converting it into audio output data, or sound waves, as constructed according to the principles of the present invention.

Referring now to FIG. 2, the major hardware components to perform the reverse process are presented, starting with a sheet of print media that contains a printed "sound file" page at 42. This is directed to an optical scanner 50, which could be part of an AIO printer. The output from the scanner will consist of an image file 52 that is directed to an AIO driver 54, which will consist of "print-to-sound" software.

When the scanner is part of an AIO printer, the sound file page 42 will be scanned by a process that can be initiated by the press of a button on the AIO operator panel. For example, a "Scan Audio" button could be added to the operator panel, or an existing button could be used that is selectable from a menu that changes the function of some of the various buttons of the AIO operator panel.

Note that the "sound file" on the sheet of print media 42, with respect to the present invention, represents audio information in the form of a "hard-copy image" that is scanned by the optical scanner. As discussed above, both "sound" (or "audio") information and "image" data may exist on the same surface of the sheet of print media 42; when this occurs, the term "hard-copy image" may apply to either (or both of) the audio information or the image data.

The AIO driver 54 processes the resulting image file data 52 and then decodes the pattern of bars or dots into corresponding digital bits of a WAV or MP3 file, for example. Once this information has been generated, the AIO driver 54 writes the resulting WAV or MP3 file to the computer's hard disk controller via the set of communications ports 28, over a signal path 56. The hard disk drive 24 will then store this information until needed, by a request from the user, or it can occur automatically (more or less immediately) as part of an overall print-to-sound function that has been requested by the user.

The hard disk controller will send the WAV or MP3 data file over a data line 60 to the DSP module 20. This DSP module 20 is typically found on the sound card, or is part of a sound chipset located on the PC's motherboard, and will uncompress the digital data (if needed) and then direct it to a digital to analog converter (DAC) 64.

The uncompressed digital data stream from the DSP is processed in real time by the DAC chip, which then creates an analog signal 66 that is directed to a speaker 70, or to headphones if desired. This is essentially the same type of process that occurs in audio compact discs, in which a digital data stream is converted-by a DAC in real time to analog electrical signals, which are then amplified and sent through a speaker driver to actuate a speaker, thus producing sound waves that can be discerned by a human ear.

Any number of formats might be used to encode the data representative of sound information for being bitmapped and printed on a sheet of print media. For example, data bits of Logic 1 can be represented as black pixels, and Logic 0 bits can be represented as white pixels. Referring now to FIG. 3, these pixels will comprise a bitmap printed on a sheet of print media into a format of rows and columns of such bits, as generally indicated by the reference numeral 42 on FIG.

3A. As seen on FIG. 3A, the entire sheet consists of such a bitmap of sound data, although that need not be the case, such that other image or text information could also be printed on the same sheet (as discussed above).

Figure 3B:
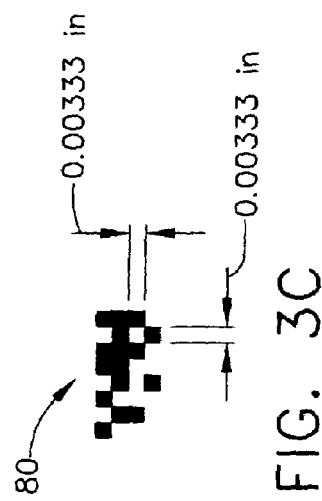
FIG. 3 comprises FIGS. 3A, 3B, and 3C, which are diagrammatic views of a sheet of print media that contains encoded audio information placed by the printer of FIG. 1.
Figure 3C:
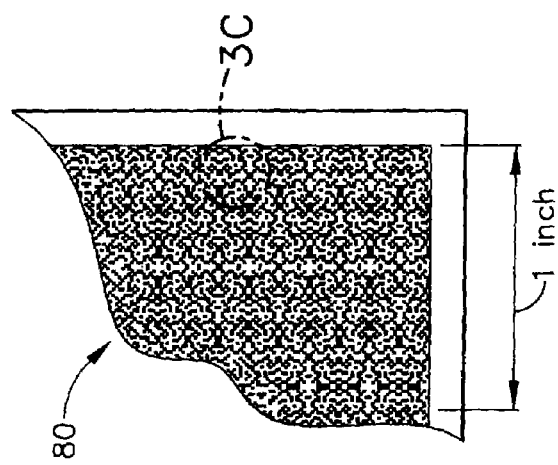
Figure 3A:
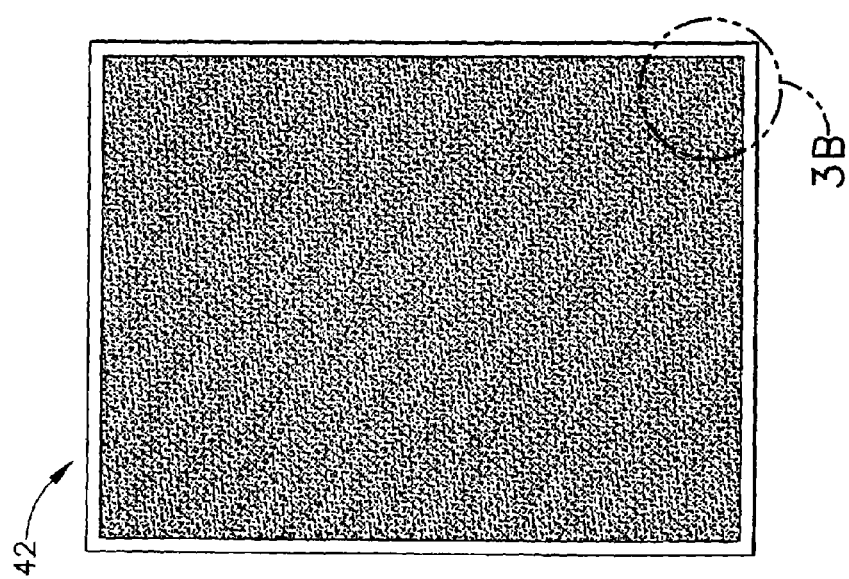

A portion of this bitmap data 42 is illustrated in FIG. 3B, in which the printed data at 80 is illustrated as 300 dpi (dots per inch) representations of black and white pixels, in which there are 300 pixel positions per inch in each row, and also 300 row positions per inch. Another example of the bitmap data 80 is illustrated in, FIG. 3C, in which the actual size of each dot is indicated as the rotated linear dimensions. In this example, the pixel diameter will nominally be 0.00333 inches, and for a standard letter size page that is printed with 0.25 inch margins on each side, plus top and bottom, there are 8.0×300=2400 pixels per row, and 10.5×300=3150 rows per page. This is a total of 7.56 million pixel locations, which corresponds to a sound page memory size of about 0.945 megabytes.

If the original sound file was in the MP3 format, the page of audio data 42 could hold roughly one minute of two-channel audio information, or about two minutes of single-channel audio information. It is clear that a fairly long greeting message could be recorded, and even music could be added or perhaps could comprise the entire recording of such an audio information representation on the sheet of paper described in FIG. 3.

It will be understood that the "microphone" and "speaker" discussed above could actually comprise devices that can produce stereo signals and stereo sounds, if desired by the hardware designer of the present invention. In fact, more than two channels of audio data could be produced by multiple microphones, then stored in WAV or MP3 files. Later such multi-channel data could be appropriately printed on the print media, still later to be scanned by an optical scanner and de-compressed (uncompressed) to produce multiple channels of audio data. These multiple audio data channels could be converted to separate analog signals (a multiplexer could be used here, if desired), which could then be amplified and directed to multiple speakers. Of course, while in digital form, the "multiple audio data channels" could exist inside a single digital data stream that includes time-marked data for each of the multiple channels.

It will also be understood that the term "audio" generally refers to any type of sound waves, and when used with the present invention, such sound waves will usually exhibit an "audio frequency" in the range of 20 Hertz to 20 KHz, which is the typical range of frequencies that can be discerned by a human ear. However, the present invention is not limited to this "usual" range of sound wave frequencies, and there may be applications in which sound waves having a frequency greater than 20 KHz (i.e., ultrasonic) are input or output to and from the present invention; or there may be applications in which sound waves having a frequency less than 20 Hz (i.e., infrasonic) are input or output to and from the present invention. Similarly, the term "audio-frequency" signal generally refers to any type of electrical (or perhaps optical) signal that is an analog to, or otherwise representative of, sound waves after such sound waves have been converted from acoustical energy to, another form of energy (e.g., electricity or electromagnetic waves). If such an audio-frequency signal is to be "heard" by a human being, then it necessarily must be made up of signals that fall within the normal hearing range of 20-20,000 Hertz, although such signals could always be frequency-shifted to another range for one reason or another, and then later re-shifted back to the normal hearing range (i.e., 20-20K) when presented to an audio speaker. Of course, an audio-frequency signal could also represent an ultrasonic or infrasonic frequency, if desired, in which case its electrical or optical waveforms could fall outside of the "normal" frequency range. However, all of these possibilities are contemplated by the inventor of the present invention.

It will be further understood that the terms "record," "recorded," and "recording" are used herein to describe a function in which the input data (i.e., either image data or audio information data) is stored, printed, or otherwise memorialized by the devices of the present invention. In general, the act of recording input data that is to be printed will involve sending a print job to a print engine (or printhead) so that dots (e.g., toner or ink) are made upon a sheet of print media to form a "hard-copy printout". This print job can contain both image data (as in a "standard" print job) and audio information. The audio information component can be sourced from a microphone, or from a data file that was stored on a magnetic media, an optical media, an electronic media (e.g., RAM or ROM), or even from another sheet of hard copy print media. Another method for recording input data in the present invention is to store information—which can comprise "standard" print job image data or audio information (or both)—as a "file" on magnetic media, optical media, or on an electronic memory device such as RAM or EEPROM. This second method of recording would generally involve a computer device that controls the data bits as they are written into the memory device.

Modern ink jet or laser printers, including those integrated into AIO's, easily can print with resolutions of 600 dpi or higher, and are capable of printing the example pattern illustrated in FIG. 3. Current consumer scanners on the market, including those integrated into AIO's, scan in monochrome or color at resolutions of 600 pixels per inch or greater. These devices can produce an adequately high resolution image bitmap of the audio information print pattern described above. The software to analyze the image file can be easily produced to locate and read the black and white pixel positions, and then convert this data into a WAV or MP3 file format. The scanning software can identify the boundaries of the printed data (i.e., the four edges and then the four corners), and calculate the X and Y coordinates at which each pixel position will be located. The scanning software will then examine each pixel location and determine if the recorded brightness is above or below the black/white threshold expected for such pixels. If color dots are used instead of black and white dots, then the scanner will be utilized to inspect the image in the same manner, but will categorize the data according to each pixel's red, green, and blue (RGB) color component values. The image processing software will then compare the scanned pixel data to thresholds of light or dark levels of the RGB color components of the image data. (The various intensities of color values for pixels in each separate color plane are sometimes referred to as "gray level" data in many image processing methodologies.)

Many variants of the sound page data format are possible, using either higher or lower resolutions, different pattern styles, perhaps with added reference marks for delimiting the patterns, or for page rotation detection and correction, or for other similar features or combinations thereof. Moreover, the pixels in the drawings of this patent document are black or white, but as discussed above, color pixels could be used to store vastly more data on a page, or perhaps grayscale dots could be used in which more than one threshold for a single color hue could be used to determine more than two possible states of brightness or darkness for each pixel. This could tremendously increase the amount of data stored on a single sheet of print media. If color is used, the software will again identify the boundaries of the data, including the four edges and then the four corners, and then calculate the X and Y coordinates where each pixel position will be located. The software will then examine each pixel location and determine if the recorded light for each red, green, and blue (RGB) channel is above or below one of the set thresholds. Of course, different colors could be used, such as the primary printing colors of cyan, magenta, and yellow (CMY). These and other variants are not entirely critical to the function of the present invention, however, they are contemplated by the inventor and thus within the scope of the present invention.

Figure 4:
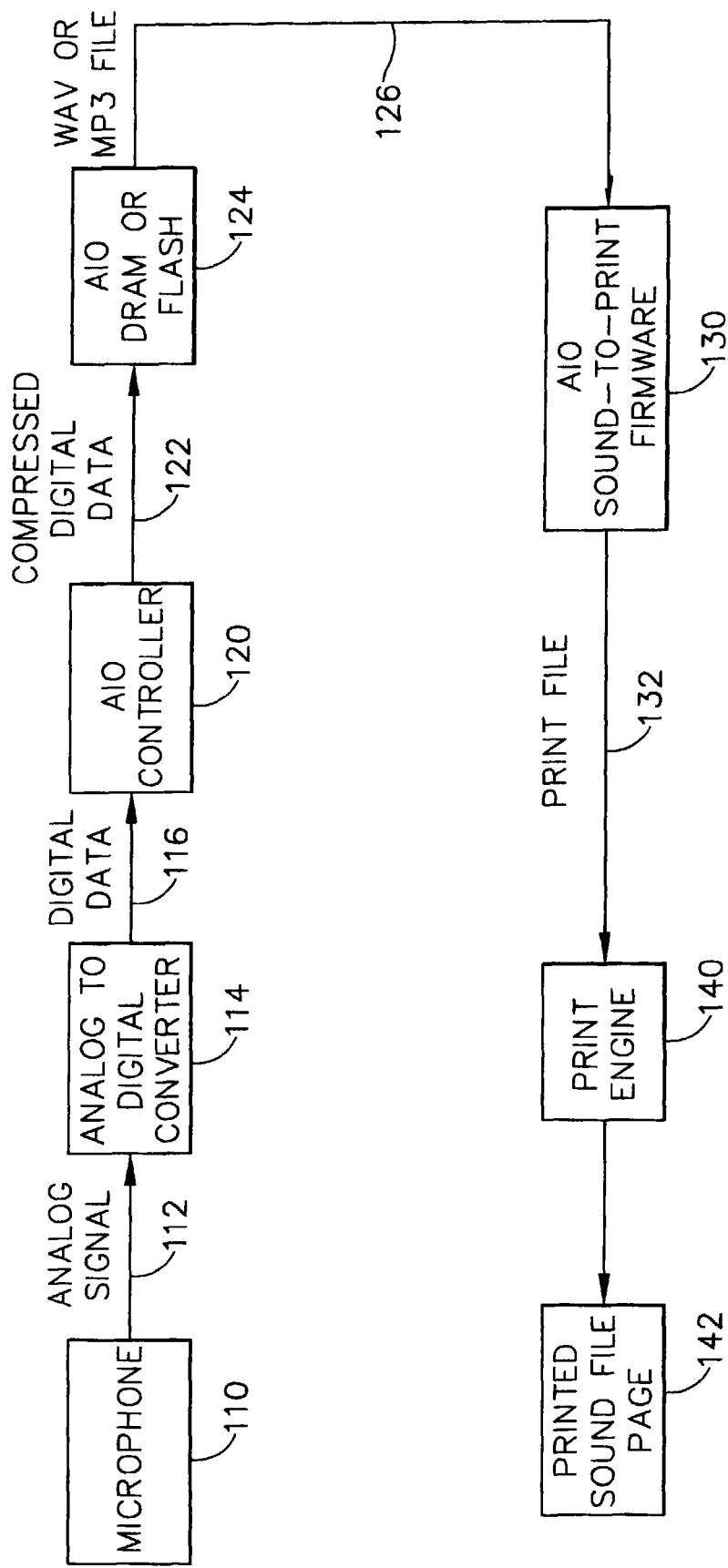
FIG. 4 is a block diagram of some of the important hardware components used in a standalone printer that receives audio or sound data and converts it to a printed representation of that audio information, as constructed according to the principles of the present invention.

Referring now to FIG. 4, the process of inputting sound waves and creating a print file is illustrated, this time for a standalone AIO-type printing apparatus. In this circumstance, a microphone and speaker set needs to be added to the "standard" AIO printer, as well as a digital-to-analog converter chip, and some small amount of cabling. In addition, the speaker typically will require some type of driver or amplifier that normally would not be needed for a standalone AIO printer without these inventive features. In addition to the above, the AIO controller will be used to perform certain "new" functions.

Beginning with a microphone 110, the sound waves are received and converted into electrical analog signals at 112, and these are directed to an analog-to-digital converter (ADC) 114. The ADC 114 converts the analog signals to digital data 116, which is then directed to an AIO controller 120. In this instance, the AIO controller will be used with appropriate software routines to compress the digital data, and this compressed data is output at 122 and directed to a temporary memory storage device. In a standard AIO printer manufactured by Lexmark International, Inc., for example, this temporary memory could be either dynamic random access memory (DRAM) or flash memory that would typically be found on such a printer.

This data stored in the AIO memory 124 could be in a WAV or MP3 file format, for example, which would be produced by the AIO controller 120, if desired. This WAV or MP3 file information is directed at 126 to firmware in the printer at a module or function 130 that will act as an AIO "sound-to-print" function. The AIO firmware 130 is under the control of AIO controller 120. This firmware will produce a print file 132, which means that it will create a rasterized bitmap file that is directed to a print engine 140. The print engine 140 will then place dots or toner on a printed sound file page 142, which is a sheet of print media.

As discussed above, the sound converted by the microphone 110 is run through an ADC 114, which could be the analog-to-digital converter that is used to handle CCD pixel data for the scanner portion of the AIO device. The AIO controller 140 will preferably compress the digital data using software audio compression routines such as WAV or MP3 techniques, as described above. The data that is formatted into print bitmap data by the AIO sound-to-print firmware 130 (and output to the print engine 140) may be printed on any type of print media capable of being printed by this particular print engine 140, and this data representative of audio information can be printed within or without a "standard" print job. Alternatively, the audio information could be embedded in photographs or in other types of image or text character presentations, which could be selected by the AIO printer designer, or perhaps some of the selections could be made user-selectable.

The coded pattern printed on the print media can later be scanned, and the major hardware components for implementing this function on an AIO printer are illustrated on FIG. 5. Starting with a printed sound file page 142, a scanner 150 will create an image file that is directed at 152 to some AIO firmware 154 that will be referred to herein as "print-to-sound" firmware. The AIO firmware 154 is under the control of AIO controller 120. This AIO firmware 154 includes computer programming that detects and stores in memory the coded pattern, by sending it at 156 to a memory device in the form of a WAV or MP3 file, for example. The memory device is, as in FIG. 4, the AIO dynamic RAM (DRAM) or flash memory 124. Of course, alternative memory devices could be used, including a hard disk drive or a read-write optical disk drive, if desired.

The data at 156 preferably will be stored as compressed digital data, and once the printer is ready for "playing" the audio information, the data as compressed digital data at 160 will be sent from the memory device 124 to the AIO controller 120. The AIO controller will decompress (or uncompress) the digital data stream, thereby providing digital data at 162 to a digital-to-analog converter (DAC) 164. This DAC 164 will convert the digital data to an analog electrical signal at 166, which will then be presented to a speaker 170 so that a user can literally hear the message that was stored on the printed sound page "file" of the print media 142. As described above in connection with FIG. 2, the DAC 164 and any type of electronic driver or amplifier to drive a speaker is fairly standard equipment, and could be very similar to the compact disc technology that has been around for decades.

Figure 5:
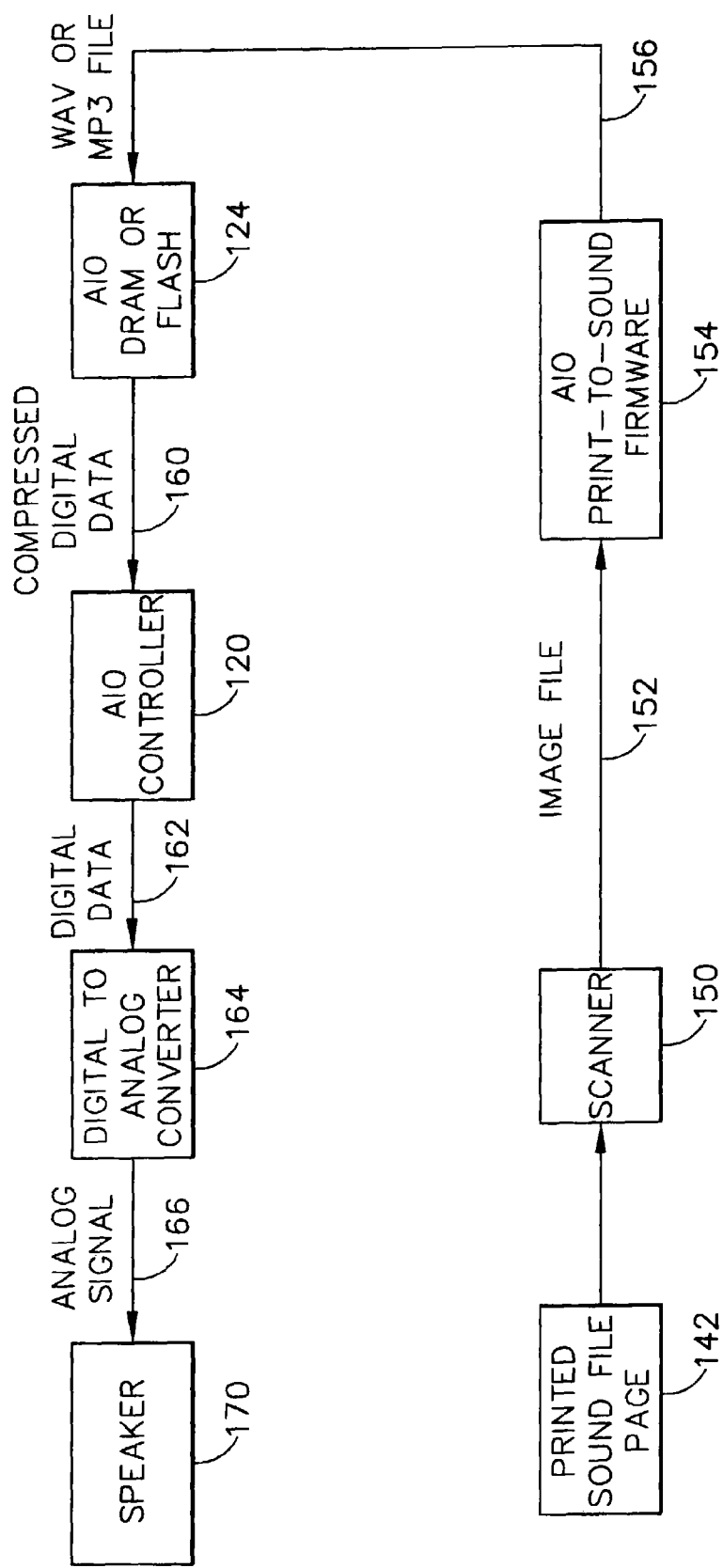
FIG. 5 is a block diagram of some of the important hardware components used in a standalone device that receives a printed representation of audio information via a scanner, and then converts it to an electrical audio signal or to sound waves, as constructed according to the principles of the present invention.

The standalone implementation described in FIGS. 4 and 5 basically requires only an additional microphone and speaker to complete the necessary hardware components, as compared to conventional AIO printers. Of course, additional software or firmware routines will be required to receive microphone audio data and then convert that to print data, and to receive scanner information as an image file and convert that to audio information that will drive a speaker. As noted above, the software routines could be stored in a host computer if the AIO printer is used in conjunction with such a host computer rather than operating in a standalone environment. Moreover, the host computer could also provide the microphone and speakers, thereby virtually eliminating any extra hardware cost as compared to conventional AIO printers. In either situation, a separate operator panel button defined as a "Scan Audio" button could be added if desired, or existing op-panel buttons could be used with a menu choice that brings up a scan audio function.

Figure 6A:
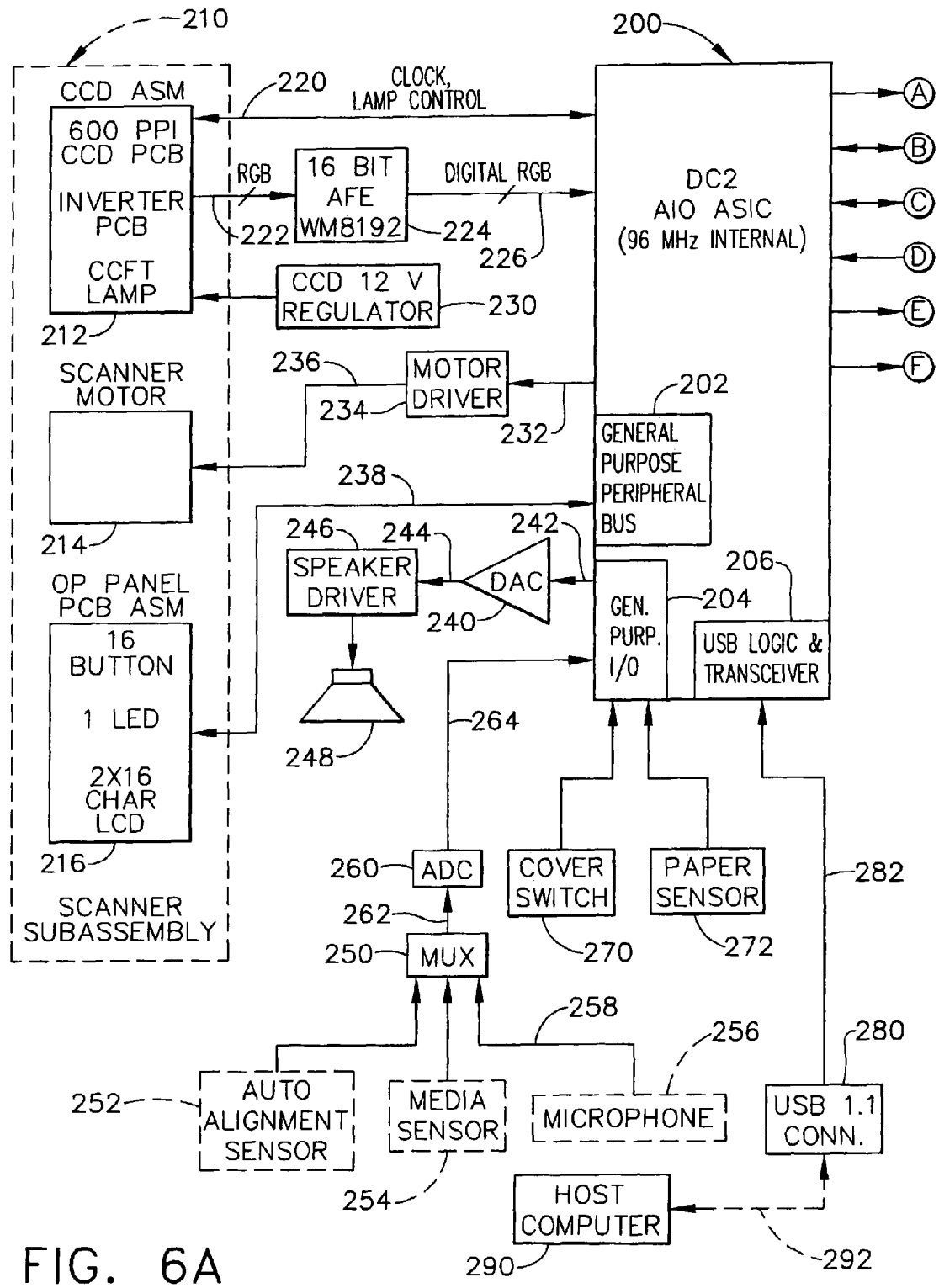
FIG. 6 comprises FIGS. 6A and 6B, and is a block diagram in schematic form of the important components used in a printing device that can scan both image data and audio representation information data, and can print that data (both the image data and the audio information data), and which includes the necessary audio input and output devices, or a connection to a host computer, as constructed according to the principles of the present invention.
Figure 6B:
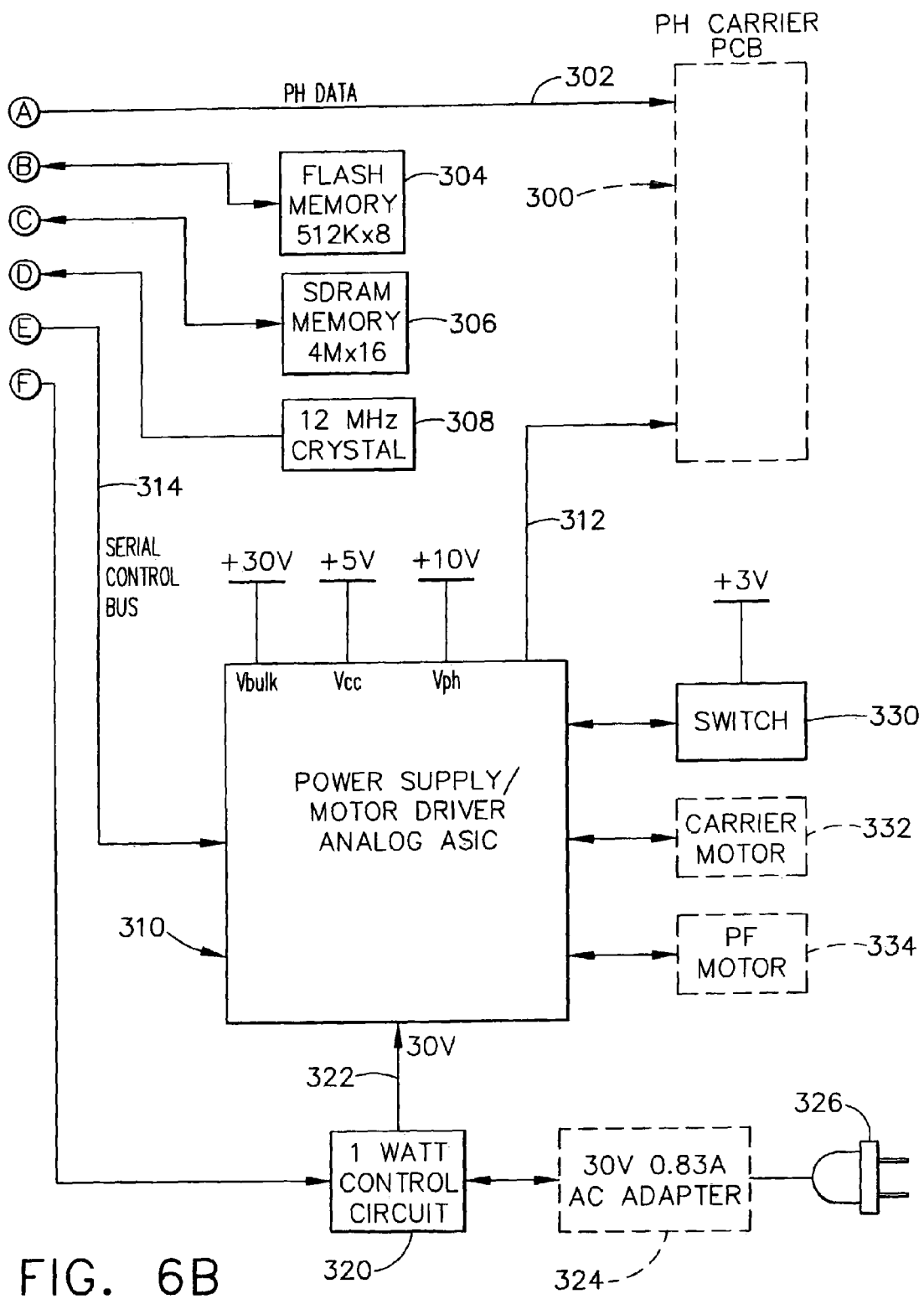

A more-detailed block diagram is presented in FIG. 6 for an all-in-one printing device that has capability of receiving audio information and converting it to print data, or is capable of scanning print data and converting that information into audio output information to be played on a speaker. FIG. 6 comprises two separate drawings, FIGS. 6A and 6B, to make up the entire block diagram.

One of the key components of an AIO printer is a microprocessor or microcontroller, and using conventional technology, such processing circuits are often found on ASIC's (Application Specific Integrated Circuits). On FIG. 6, such an ASIC is designated by the reference numeral 200, and includes a microprocessor running on a 96 megahertz internal clock. The ASIC 200 communicates to a scanner subassembly 210, which includes a CCD assembly 212 that is the main component of the optical scanner. In one available scanning device, the optical scanner operates with a precision of 600 parts per inch resolution, and communicates RGB (red, green, blue) data over a bus 222 to a 16-bit A-to-D converter, having a part number WM8192, manufactured by Wolfson Electronics. This ADC 224 outputs digital RGB data on a small bus 226 that is directed to the microcontroller in the ASIC 200.

There are also other control lines including a clock and a lamp control line 220 between the ASIC 200 and the CCD assembly 212. The CCD assembly also requires a DC power supply, which is provided by a twelve volt regulated power supply 230.

The CCD assembly 212 comprises a page width optical sensor, known as a scanbar. In conventional technology, this will be an RGB page width scanbar with three (3) rows of color sensors with a resolution of 600 dots per inch, and which is 8 ½ inches wide. This provides 600 dpi times 8.5 inches of pixel information per color, which provides 5100 pixels of information per color per scanline. A motor 214 is used to move the scanbar, and this scanner motor 214 is controlled by a motor driver 234. The ASIC 200 provides control signals at 232 to the motor driver 234, which then outputs the appropriate electrical signals at 236 to the actual scanner motor 214.

The scanner subassembly 210 also is in communication with an operator panel assembly. In an all-in-one printer manufactured by Lexmark International, Inc., there are sixteen (16) manually-actuatable buttons, as well as at least one LED indicator and a small character liquid crystal display. This entire op-panel assembly is designated by the reference numeral 216 on FIG. 6. The op-panel 216 communicates over a general purpose peripheral bus 238 to inputs on ASIC 200 that receive general purpose peripheral bus signals at 202.

The ASIC 200 also includes an interface at 204 for a general purpose set of inputs and outputs, referred to as general purpose I/O. This general purpose I/O outputs a digital signal at 242 that is run through a DAC 240, which converts the digital information into an analog electrical signal at 244 that is then presented to a speaker driver module 246. The output of the speaker driver drives the speaker 248, which will, of course, play the analog signal as audio information that is converted into sound waves for the user's listening enjoyment. As noted above, the DAC, speaker driver, and speaker itself would not be necessary on an AIO printer that will definitely be connected to a host computer that contains its own speakers.

The general purpose I/O 204 is also used to receive sensor inputs, such as the cover switch 240 and a paper sensor 272. In the present invention, the general purpose I/O 204 can also be used to receive other sensor information through a multiplexer 250 and an ADC 260. This other input data can include an automatic alignment (or "auto-alignment") sensor 252, a print media sensor 254, and a microphone 256. The output of the microphone 256 is an analog signal at 258, which is directed to the multiplexer 250. The multiplexer 250 will select an input and output that signal along a communications path 262 to the ADC 260, and the output of that ADC will be digital data at 264 that is directed to the general purpose I/O 204 on the ASIC 200.

ASIC 200 also has interface capability for a USB port at 206. This is in the form of USB logic and transceiver, that can be used along a signal line 282 to interface to a USB 1.1 connector 280. In today's conventional printers, the USB ports are the common device for connecting a printer to a host computer. On FIG. 6, a host computer 290 is connected to the USB connector 280 via a cable 292.

Some of the signals of the ASIC 200 must be depicted on a separate sheet of paper, at FIG. 6B, by use of the signals that run through nodes with letter designations A-F. The signal that runs through A represents the printhead data along a communication path 302, that is presented to a printhead carrier printed circuit board 300. In general, this could be any type of printhead data required, to control the printhead, but will definitely contain the video data that has been rasterized into bitmap information for driving a series of ink jet nozzles on an ink jet printer, for example. Of course, if this was a laser printer, then the "printhead carrier" would be referred to as a "laser print engine."

The signals that run through the node B represent address lines and data lines that interface to a flash memory module 304. Similar address and data lines run through the node C that interface to a synchronous dynamic RAM (SDRAM) memory module 306.

Node D communicates a clock signal from a crystal oscillator circuit 308 to the ASIC 200, used to drive circuit components, including the microprocessor itself after the frequency has been multiplied.

The node E represents signals that run over a serial control bus 314 to control a power supply/motor driver analog ASIC, generally designated by the reference numeral 310. This analog ASIC 310 receives three different DC power supply voltage levels, and also outputs a power supply at 312 to the printhead carrier printed circuit board 300.

The node F transmits a signal from the ASIC 200 to a control circuit 320 that maintains the maximum power to less than one Watt of electrical power consumed by the power supply/motor driver analog ASIC 310 when in the "standby power" state. This one Watt control circuit 320 uses a signal at 322 to implement this control function.

A 30 volt, 0.83 Ampere AC adapter at 324 provides power to the control circuit 320, and receives power from a wall plug 326. Other interface devices to the analog ASIC 310 include a power switch 330, the printhead carrier motor 332, and the paper feed motor 334. Most of these devices are fairly typical and are found on most conventional printers.

Figure 7:
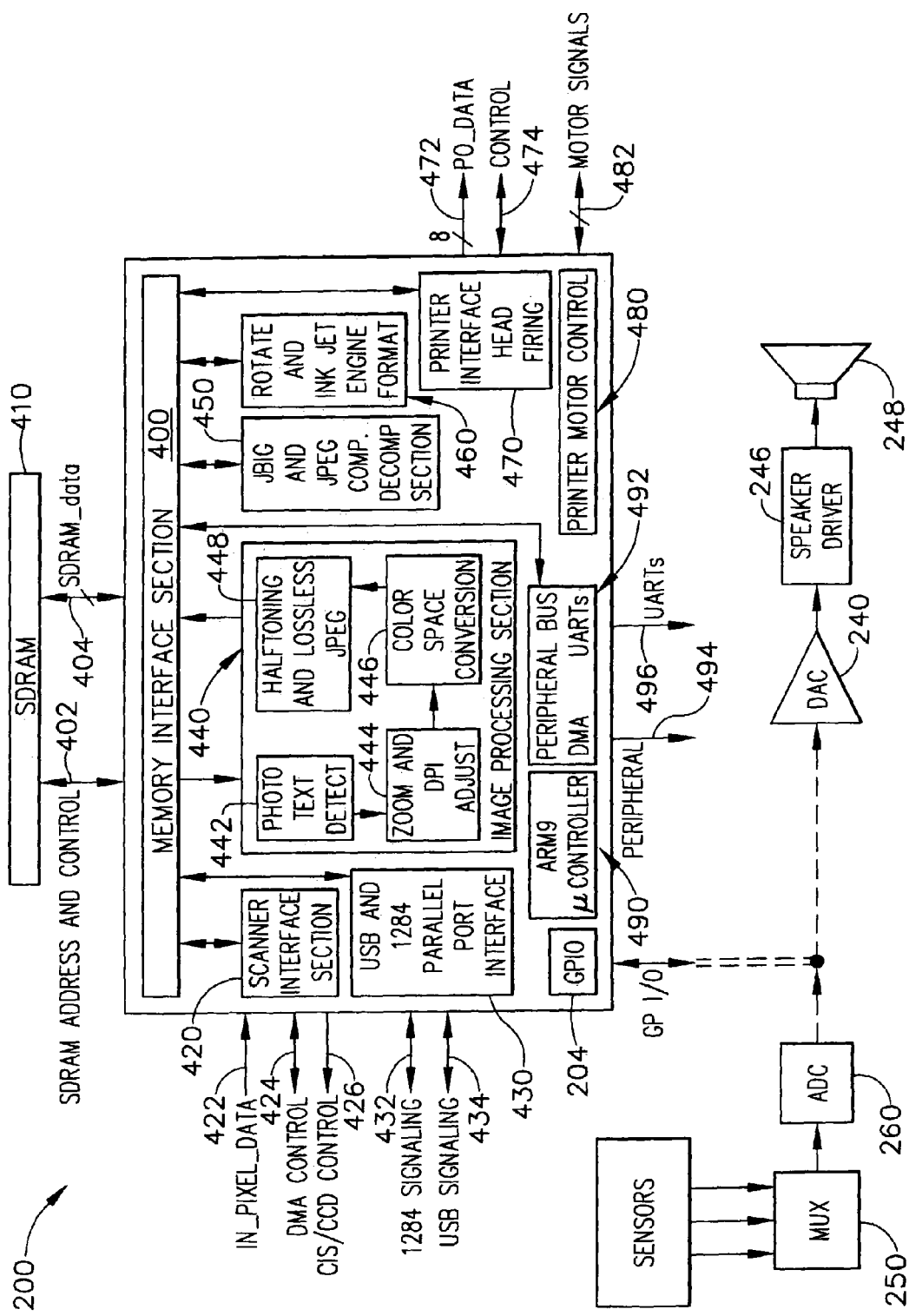
FIG. 7 is a block diagram of some of the important hardware components of the ASIC of the printer of FIG. 6.

To provide a more complete description of the workings of the present invention, FIG. 7 is provided to illustrate some of the major hardware modules of the AIO ASIC 200 of FIG. 6. Many of the hardware modules found on FIG. 7 are typical for conventional printers that are manufactured by Lexmark International, Inc., particularly for ink jet printers. Of course, other configurations could be utilized to perform the same functions without departing from the principles of the present invention.

ASIC 200 interfaces with external RAM, in this case synchronous dynamic RAM at 410. Through some address and control lines 402, the main functional devices of the ASIC 200 are interfaced through a memory interface section 400 to this SDRAM 410. The actual data lines interfaced to the SDRAM 410 are depicted at 404.

As would be expected, many of the functional modules of the ASIC 200 are interfaced to the memory interface section 400, either to retrieve data, or to store data for later retrieval as needed. A scanner interface section 420 of the ASIC is interfaced to the memory interface section 400, and also provides DMA (direct memory access) control over signal lines 424. The scanner interface section 420 also outputs control signals at 426 for the CIS/CCD components (i.e., the CIS scanbar or the CCD scanbar), and receives input pixel data at 422 from the scanner. A USB and IEEE 1284 parallel port communications interface is provided at 430, which interfaces with the memory interface section 400. This USB and parallel port interface communicates to external devices using USB signaling at 434, and/or 1284 signaling at 432.

An image processing section generally designated by the reference numeral 440 is also in communication with the memory interface section 400. A large amount of the processing power of the entire system 200 is used for the image processing section, especially if any type of rendering or rasterizing must be performed. For conventional ink jet printers, the bitmap data is typically produced by a host computer, so the actual rendering or rasterizing would not need to take place at the image processing section 440. However, if the AIO is to operate in a standalone mode, then the image processing section 440 must perform all of the required tasks. Starting with a photograph and text detection module 442, the image processing section will then also perform zoom and dpi position and correction adjustments at 444. If there are color images involved, a color space conversion module will perform such color conversions at 446. Finally, a halftoning module 448 is provided to create the actual bitmap patterns. This halftoning section 448 will also contain a lossless JPEG function, if desired.

A compression and decompression section 450 is provided, and this can use JBIG or JPEG compression/decompression routines. In standard JPEG files, the compression routine typically is lossy; of course, if lossless compression is required, then the JBIG routine can be used. Another module within the ASIC 200 is the rotation and ink jet print engine formatting routine at 460. Finally, the printer interface head firing module 470 is also interfaced to the memory interface section 400. This head firing interface 470 module also provides signals for the actual print output data at 472, and also some control signals at 474. In addition, a printer motor control section 480 is used to provide the motor signals at 482 that drive the printhead carrier and the paper feed motor drives. (Note that a laser printer would use different signals to drive a print engine.)

The main microcontroller module is designated at the reference numeral 490, and for the ASIC 200 an ARM 9 controller could be used. A peripheral bus module at 492 also communicates to the memory interface section 400. This peripheral bus module includes the DMA channels that operate over signal lines 494, and also includes UARTs that operate over a set of control lines 496.

The ASIC 200 also includes the general purpose I/O module 204 (which was also seen on FIG. 6). The general purpose I/O is used to transmit the audio data to a DAC 240, or to receive audio information in the form of digital data from an ADC 260. (These devices were also illustrated on FIG. 6.) One of the sensors driving the MUX 250 is a microphone. The DAC 240 will drive a speaker driver circuit 246, which outputs the appropriate voltage and current to drive an audio speaker 248. (The "appropriate" voltage and current that drive the speaker 248 will be such that the impedance characteristics of the speaker will be accounted for in the electronic circuit design for use in the present invention.) As discussed above, the audio components at the bottom of FIG. 7 will not necessarily be required if the AIO printer is connected to a host computer that contains its own microphone and speakers.

Allowing audio information files or data to be stored on and retrieved from print media presents several interesting abilities. For example, sound information associated with a printed document or photograph could be printed on the document or photograph itself, and easily replayed, merely by scanning that document. Such sound/audio files could be mass printed, and for example, excerpts or snippets of a new sound recording could be distributed simply as a page in a popular magazine. Any written book, article, or document could include within itself an audio version of itself, or certain excerpts. Moreover, the audio information could be transported and distributed with less expense and care in packaging. For example, compact discs and audio tapes typically require special boxes for their media protection. Printed sound files might not even require an envelope. Moreover, the printed sound files perhaps could be reproduced with any common copier, which again allows for mass distribution of such information.

Figure 8:
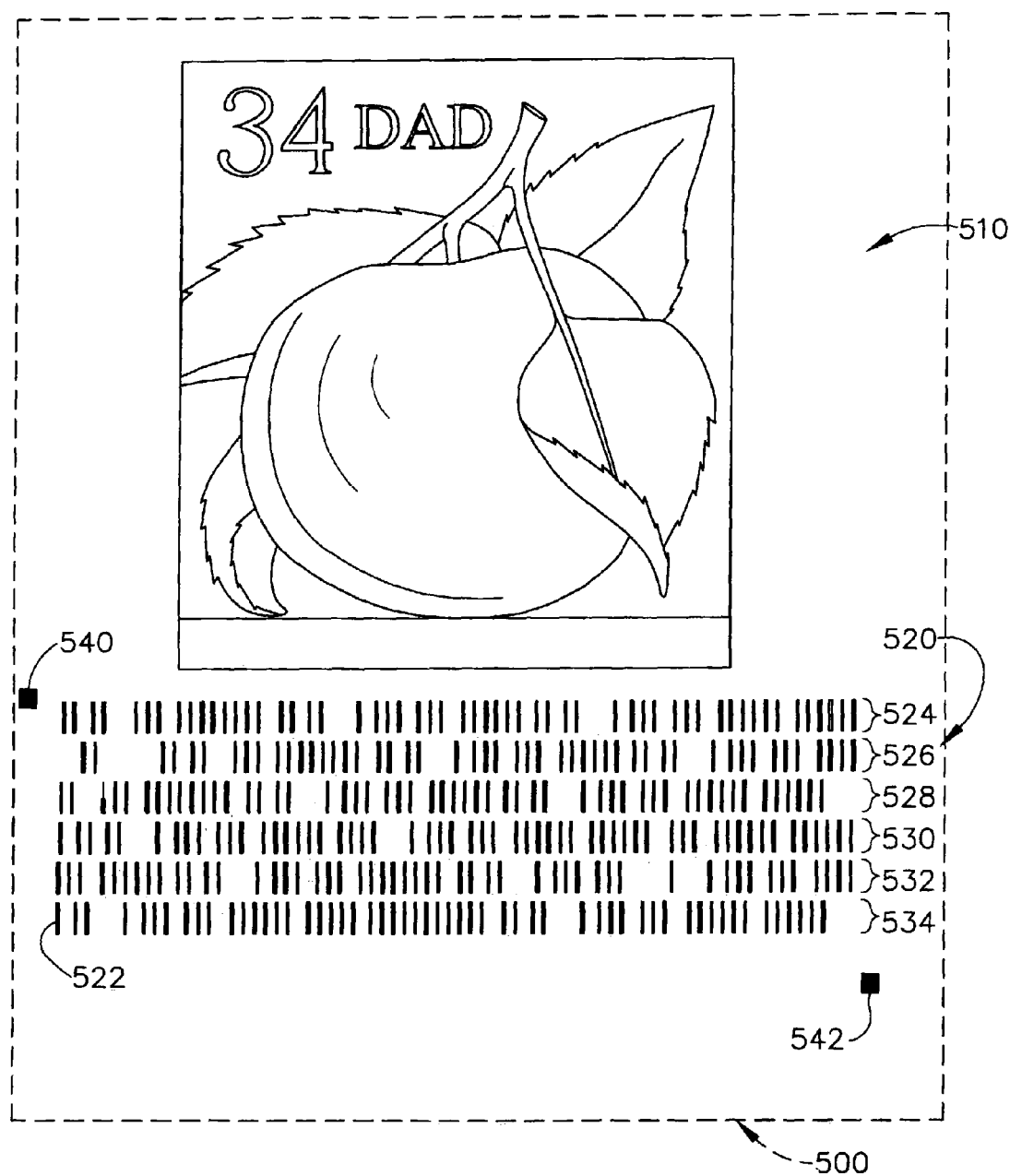
FIG. 8 is a diagrammatic view of an example printed hard-copy output that contains both image information and a representation of audio information, as produced by the printer of FIG. 6.

An example of embedding sound/audio information within a document or a photo is presented in reference to FIG. 8. As noted above, the printed sound "file" could be associated with, or embedded in, a printed document or photograph. For example, it could be printed as part of the document or alongside a photograph in some fashion. On FIG. 8, an image is printed at 510, while the audio information is printed in a set of rectangular bars that are arranged in rows and columns, in which the entire audio information "file" is generally designated by the reference numeral 520. The entire printed document is generally designated by the reference numeral 500.

The sound or audio data 520 is presented in several rows and columns, and on FIG. 8, there are six rows at the reference numerals 524, 526, 528, 530, 532, and 534. A single data element of the sound file is illustrated at 522. It might be helpful to use some type of symbol as a delimiter of the "boundaries" of the sound information on a printed document, and such delimiters are portrayed at 540 and 542 on FIG. 8. In FIG. 8, these delimiters are merely dark squares, but they could be virtually any type of special symbol desired by the system designer. The use of special delimiters around, adjacent, or proximal to the audio information on the sheet of print media would be particularly desirable in situations where the user may put the source paper document on the scanner at a skewed angle, for example.

As described above, the sound data 520 could be reproduced as a fairly light color, such as yellow, or it could be printed as a fairly light gray level (i.e., of relatively low color intensity) of a different color, if desired. If an unobtrusive appearance of the sound data is not important, then of course the data could be presented as (rather visually obvious) strict black and white bars (or dots), as illustrated in this patent drawing of FIG. 8.

As illustrated on FIG. 8, the sound information 520 could be printed on the same side of the print media as the photograph image 510 itself, although it could also be printed on the reverse side of such a photograph or document, if desired. Naturally, if it is printed on the reverse side of a document, then there would probably be less reason to present the sound file portion of the overall printed document in a less obtrusive manner, and furthermore, perhaps the entire reverse surface of the print media could be utilized strictly for the sound information. As discussed in reference to FIG. 3, a standard letter sized 8 ½×11 sheet could contain a very large quantity of data, which could represent more than a minute of audio information.

One option not illustrated on FIGS. 6 or 7 is a "play" button that could be added to the operator's panel. Another option that could be included is a "code sniffer" that automatically determines whether or not any audio information is contained on the sheet of paper or transparency, that is being scanned. This code sniffer function would probably be an alternative to using delimiters adjacent or around the audio information, as discussed above.

Audio Append Function.

Figure 9:
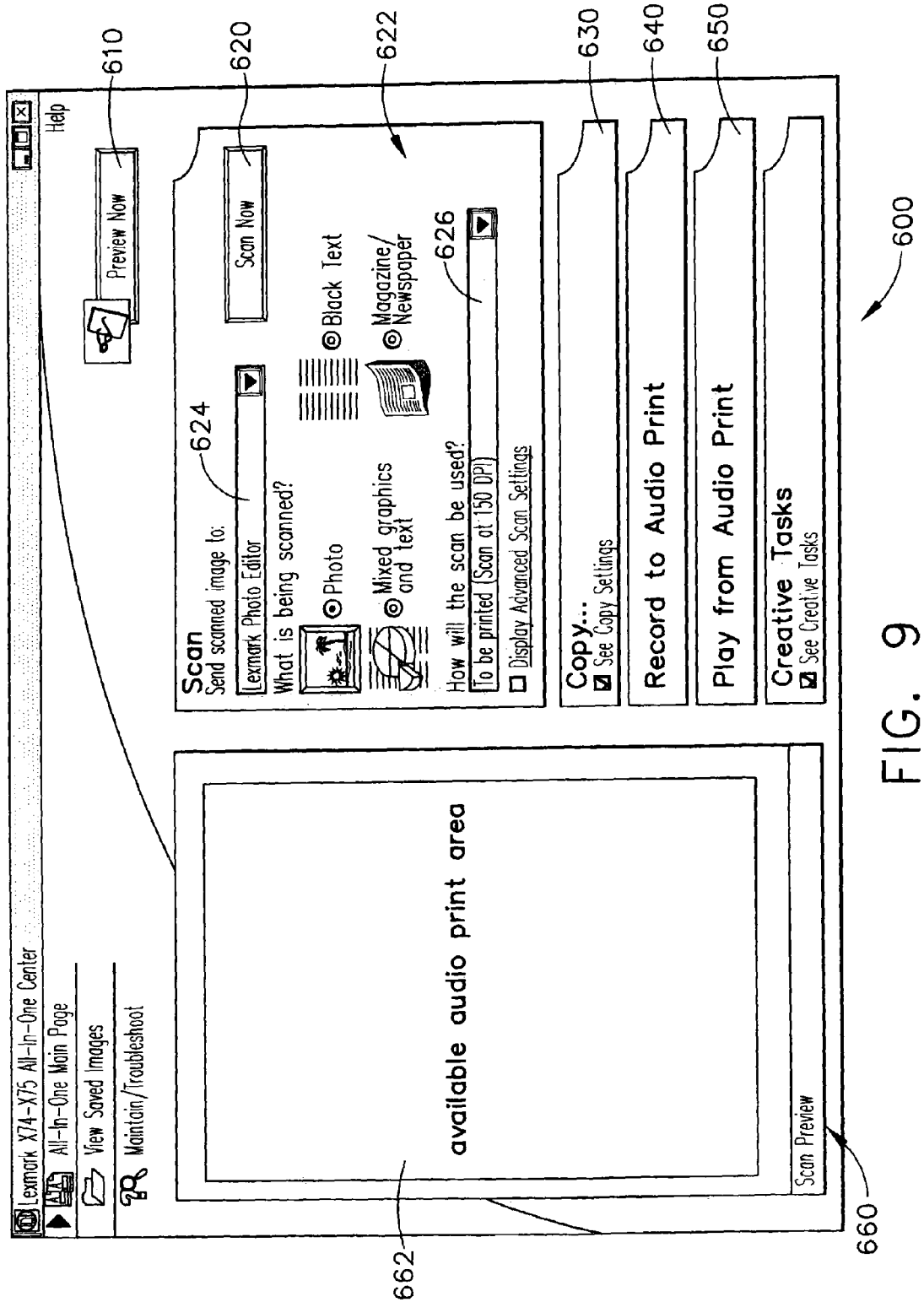
FIG. 9 is a pictorial view of a monitor screen provided by the present invention when in a record mode of operation, showing a "full" area of a page that is available for receiving audio information that can later be printed on a hard-copy printout.

An alternative embodiment of the, present invention comprises an "audio append" feature which, in one mode, provides a graphical user interface (GUI) on the video monitor of a personal computer, for example, in which the GUI displays information on various screens to control some of the functions. Referring now to FIG. 9, a display screen 600 includes several user-selectable buttons and some data-entry fields from which a user may enter choices from a pop-up list. Screen 600 could be displayed on the monitor of a host computer, for example, of a system such as that described in reference to FIG. 1.

On screen 600, a "Preview Now" button 610 can be selected to display a hard-copy page of sheet media that has been scanned by the scanner of an all-in-one printer, for example. This would be under the control of the AIO driver resident on the host computer. Screen 600 also provides a "Scan" click box, and when that box is selected, several other choices appear, including a "Scan Now" button at 620. Before the Scan Now button 620 is used, several other choices can be made, including the type of image being selected from a set of choices, illustrated at 622. Such choices could be "Photo," "Mixed graphics and text," "Black text," or "Magazine/Newspaper."

A drop-down list at 624 is provided to allow the user to select the destination for the scanned image. Examples of the selectable entries that will appear when clicking on the arrow of the drop-down list 624 could be "Lexmark Photo Editor," "e-mail," "Excel document," or "Word document." Another drop-down list at 626 determines how the scan will be used, and essentially is asking the user to select a resolution while providing hints as to what typical uses would be for such resolution. For example, if the scanned image is to be printed, a recommended resolution could be 150 dpi, although if the image is to be printed at a "photographic quality," then the resolution could be much higher, such as 600 dpi.

A "Copy" click box is provided at 630, a "Record to Audio Print" click box is provided at 640, and a "Play From Audio Print" click box is provided at 650. When the user clicks on the "Record to Audio Print" click box 640, the AIO driver can provide choices concerning where the audio print file or "object" will be printed. These may be tied to the image on the driver's "Scan Preview" screen area 660, and often the Scan Preview area will retain an image of the last item scanned.

On FIG. 9, the Scan Preview screen is blank, which could occur if the AIO driver has not yet scanned an image at all. The actual data from the scanner could be displayed in the "available audio print area" illustrated at the reference numeral 662, although it should be noted that this "available" area 662 is illustrated on FIG. 9 for reference only, and may or may not actually be displayed by a particular type of host AIO driver. As an alternative, the "available audio print area" 662 could be used to provide a graphic preview (on the monitor screen) to the user that indicates how much space (or "time") is available for recording audio information on that particular sheet of print media. If this sheet is indeed printed, then the area 662 could have the audio information printed therewithin.

Figure 10:
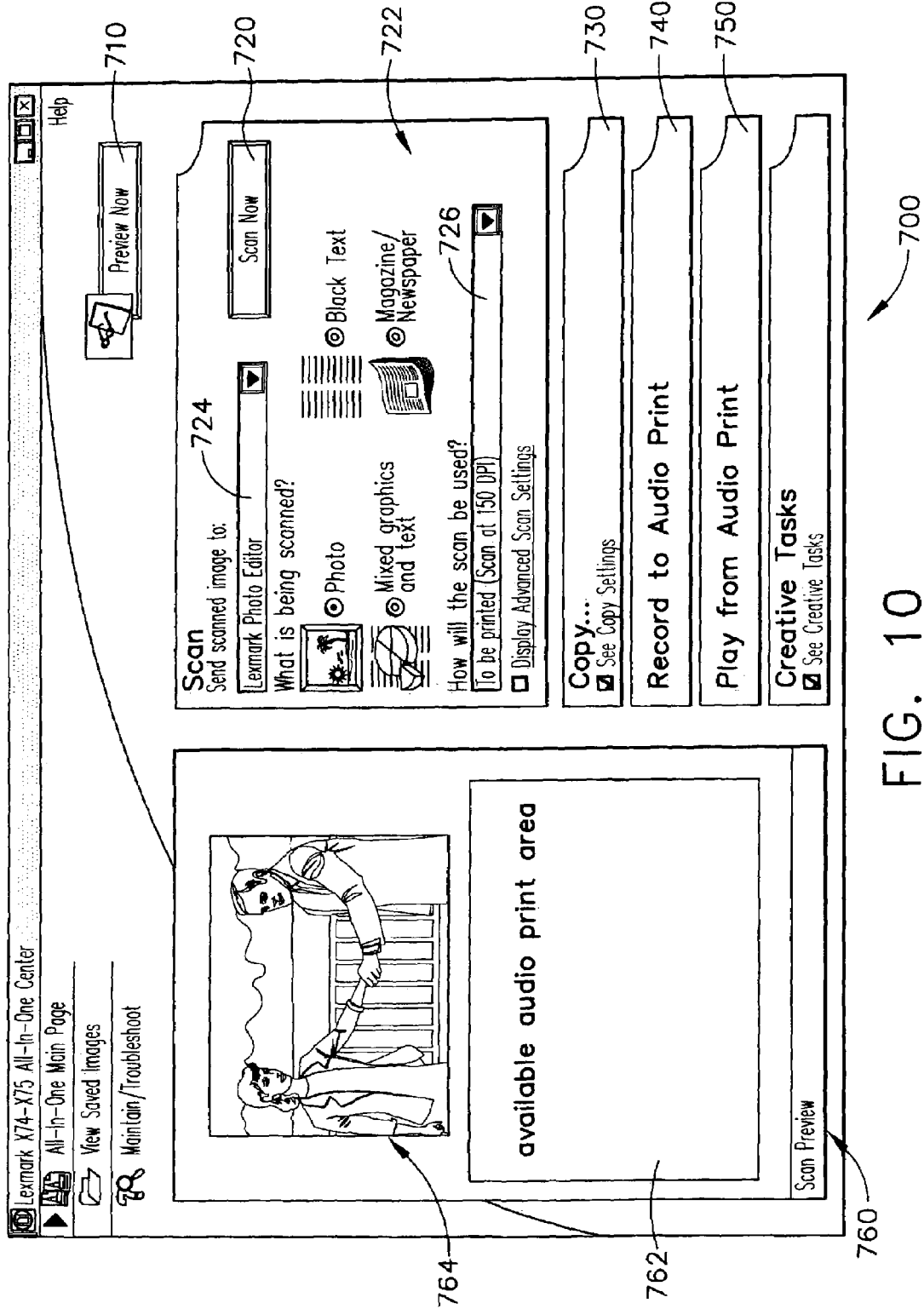
FIG. 10 is a pictorial view of a monitor screen provided by the present invention when in a record mode of operation, showing a "half" area of a page that is available for receiving audio information that can later be printed on a hard-copy printout, in which the audio information will automatically be placed into the unused (available) area on the page.

If the AIO driver has already received image data from a scanner, then that image could show up in the Scan Preview area of the display screen. An example of this situation is illustrated in FIG. 10 by the display screen 700, which shows a photograph image at 764. In FIG. 10, the same type of buttons are illustrated at 710 and 720 that were seen on FIG. 9, and also similar click boxes are available at 730, 740, and 750. The Scan click box also includes the more detailed choices, including the drop-down lists at 724 and 726, as well as the button choices at 722.

In the Scan Preview area 760, a 4×6 photograph has been inserted in the upper half of the scan area at 764. It will be understood that the photographic image at 764 could have just been uploaded by the user, or it could have been previously scanned by the scanner at the host computer, and that data could have remained available for the user's manipulation at a much later time. In any event, since the photographic image at 764 has been placed into the Scan Preview field 760, when the user clicks the Record to Audio Print click box 740, the AIO driver can provide choices such as "Print Audio Only," "Print Audio with Current [Preview] Image," or "Choose Image File To Which Audio Should be Printed." After the user clicks on one of these choices, a file lookup screen will be displayed.

If the user clicks on the Record to Audio Print function, a screen could appear that has a similarity to a WINDOWS EXPLORER-type function. In other words, an existing image file residing on the host computer could be selected by the user in a manner such as that provided by WINDOWS EXPLORER®. Another function that could be executed when the user clicks on the Play from Audio Print click box 750 is to choose the source of the audio information. This could be a-file already resident on the host computer (which could be selected by a WINDOWS EXPLORER-type function), or alternatively other image data sources could be utilized, such as a fax that was received by the AIO printer, or as a further alternative, audio data could be received from a photo card interface.

After the user selects the target for the Audio Print function, the AIO driver can provide a response to the user indicating how much recording time is available for the selected option, and also for the selected paper size. For example, if the print media is letter sized and the "Print Audio Only" function is selected, the AIO driver might respond that one minute of recording time is available. As another example, if the "Print Audio with Current [Preview] Image" function is selected, in FIG. 10 only the bottom or lower half of the print area is still available to receive "new" audio information. In this situation, the AIO driver could respond that only thirty seconds of recording time are available, and that information could be presented to the user graphically on the display 700, such as in the "box" 762.

When the scanner scans a page that contains other image information (e.g., at reference numeral 764), the user will scan the page and click on the "Record to Audio Print" click box, and then choose the "Print Audio with Current [Preview] Image" function as a button bar that appears when the Record to Audio Print click box has been selected. The user may then record additional audio information within the remaining recording time, which will be placed in the indicated area at 762 (on the printed sheet), referred to on FIG. 10 as the "available audio print area." This "available audio print area" 762 can initially be used to provide a graphic preview (on the monitor screen) to the user indicating how much space (or "time") is available for recording audio information on that particular sheet of print media.

Figure 11:
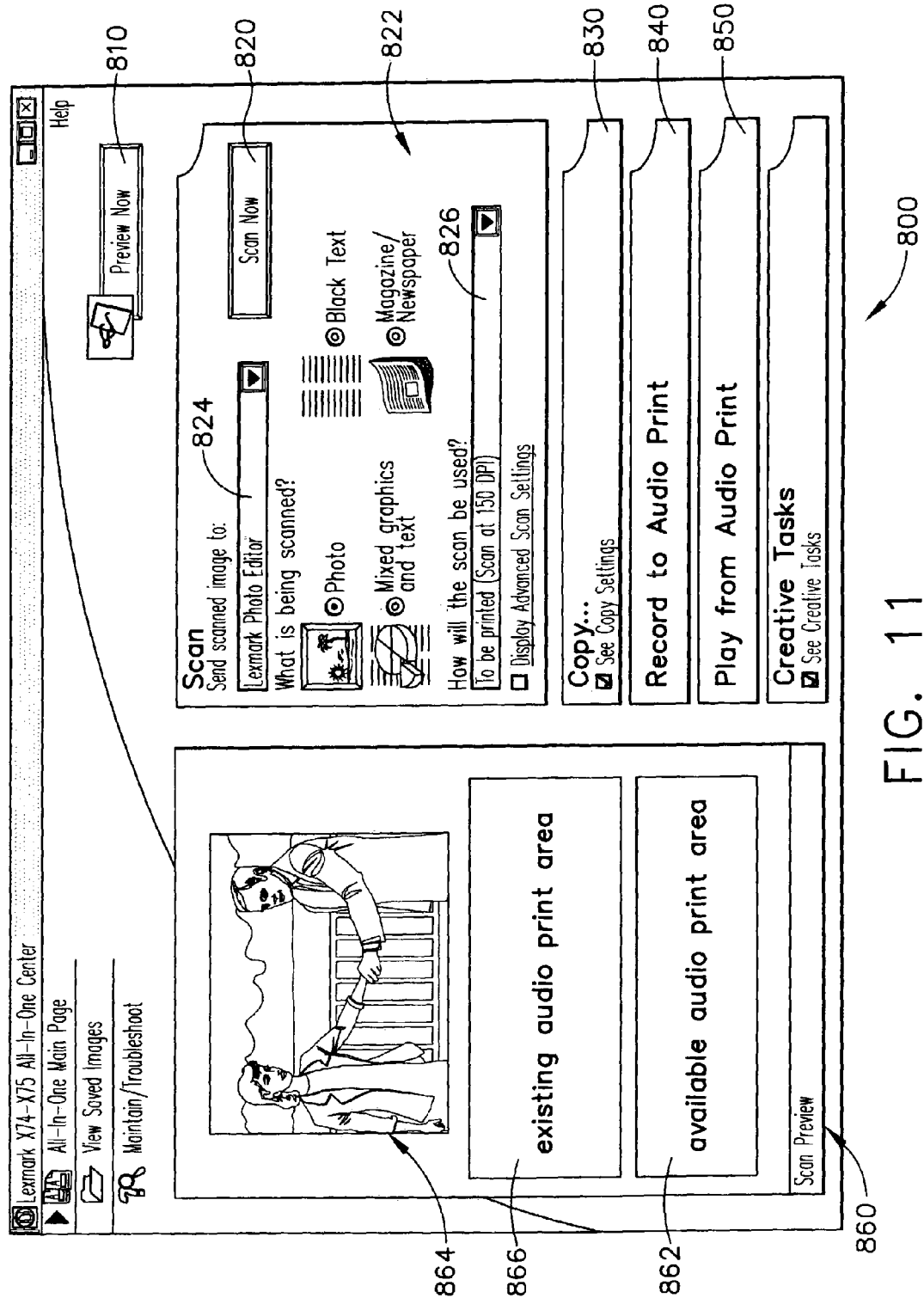
FIG. 11 is a pictorial view of a monitor screen provided by the present invention when in an append mode of operation, showing a smaller area of a page that is available for receiving audio information that can later be printed on a hard-copy printout, in which the audio information will automatically be placed into the unused (available) area on the page that is in addition to another area of the page that already contains previously-recorded (or stored) audio information.

In the situation where the "Choose Image File To Which Audio Should be Printed" function is selected, the available recording time that the AIO driver will indicate would depend on the chosen file's page contents as they already exist. In this manner, a page that already has an Audio Print portion recorded thereon may have additional audio information appended to it, in a manner that is illustrated in FIG. 11. In FIG. 11, a display screen 800 is illustrated which has the same types of button bars at 810 and 820, as well as click boxes at 830, 840, and 850, and the Scan click box with its similar choices at 822, 824, and 826. Also on FIG. 11, the Scan Preview area at 860 contains the same 4×6 photograph at 864 as was seen on FIG. 10. However, on FIG. 11, there is already existing audio information in the existing Audio Print area at 866. Therefore, a smaller amount of print area is now available, as indicated at 862.

When the scanner scans a page that contains other image information and also includes existing audio representation information (e.g., at reference numeral 866), the user will scan the page and click on the "Record to Audio Print" click box, and then choose the "Print Audio with Current [Preview] Image" function as a button bar that appears when the Record to Audio Print click box has been selected. The user may then record additional audio information within the remaining recording time, which will be placed in the indicated area at 862 (on the printed sheet), referred to on FIG. 11 as the "available audio print area." This "available audio print area" 862 can initially be used to provide a graphic preview (on the monitor screen) to the user indicating how much space (or "time") is available for recording audio information on that particular sheet of print media.

The above discussion concerning FIGS. 9-11 deals with a situation where all of the information is to be printed on a single sheet of print media. As discussed above, additional audio information may automatically be appended to such a sheet of print media, generally by scanning an existing sheet which will then be analyzed by the AIO driver so as to determine how much recording time remains for further use by the user. In this situation, the user can print an entire new sheet of print media that will contain all of the information, including the original image and audio information that was presented on the initial sheet of print media. Or as an alternative, the user could take the initial sheet of print media and place it back into the paper tray of the AIO printer, and then have the appended audio information printed in its proper location on that original sheet of print media.

As a further alternative, the present invention can automatically append further audio information on additional sheets of print media. In this situation, the amount of recording time for additional audio information could be essentially limitless, if desired. All that would need to be supplied are additional sheets of paper to receive the new audio information that will be printed.

Another alternative use of the present invention is to create PowerPoint® presentation images, in which not only text and graphical image information is provided on each of the PowerPoint slides, but also one or more of the slides could contain the audio information that can later be played back by the printer of the present invention. This would allow the speaker of a seminar to not only disseminate his or her PowerPoint presentation pages as paper handouts that can be visually examined by the audience, but also one or more of these sheets of paper could be literally "played" on the AIO printer of the present invention, so that the speaker's voice could be heard at a later time. This could be quite useful in allowing persons to re-present portions of the seminar to third persons, perhaps at remote locations or at a later time.

The present invention can be arranged in various configurations, and in many cases not all of the components described above need to be present in each of the configurations. For example, an image scanning and audio playback system could be constructed using an optical scanner and an audio speaker as the basic components. To properly receive data from the optical scanner, a processing circuit and a memory circuit would be required, and the audio information resident on a sheet of paper that is being scanned by the optical scanner will be detected by the processing circuit, and will be loaded into the memory circuit for later processing. As an alternative, the audio information could be stored in a bulk memory device, such as a hard disk drive or some type of optical memory device, such as a read/write CD-ROM. Using this hardware configuration, the audio information is converted into an audio-frequency signal that is directed to an output interface circuit, and this output interface circuit directly drives the audio speaker; the user can thus play back (and hear) the audio information that was originally stored on the sheet of paper scanned by the optical scanner.

It will be understood that the term "optical scanner" herein refers to any of several devices used to optically sample images, including such conventional devices as CCD or CIS sensors implemented in flatbed, sheetfed, handheld, or other physical arrangements found in existing scanning, camera, or other types of imaging systems. The term "optical scanner" herein may also refer to reflective sensors, such as the type used as an auto-alignment sensor in many conventional ink jet printers.

A sound "print and read" function within the scope of the present invention can be implemented solely on an ink jet printer, if, for example, the printer's auto-alignment sensor is used to scan a page containing audio information as that page is fed through the printer's paper path. In this arrangement, the term "optical scanner" and "optical sensor" have virtually the same meaning. As described above, the auto-alignment sensor (or another type of optical sensor) can be used to detect ink or toner that reflects light in wavelengths that are literally invisible to the human eye, such as in the infrared spectrum.

When using a printer in the above "print and read" mode of operation, the audio information on an input sheet of print media that is detected by an auto-alignment (or other carrier-mounted) sensor can be separated from all other types of image data that also exists in the input sheet of print media, if desired. This received audio information can then be re-formatted and sent to the print engine (or printhead) of the same printer and printed solely as a sound file on a second sheet of print media (or stored in memory for later use by this printer, or by a host PC if the user desires to store this sound file at the PC). Alternatively, this received audio information can be re-formatted and combined (or appended with) additional audio information to created a different sound file that can be printed by the same printer (or stored in memory for later use by this printer, or by a host PC if the user desires to store this sound file at the PC). The additional audio information could be derived from yet another sound file stored in the printer or on a PC, or it could be derived from a microphone that is mounted on, or in communication with, the printer (or mounted on a PC that is connected to the printer).

In one form of the configuration discussed in the above paragraph, the audio speaker and the interface circuit could be resident on a computer device (such as a PC) that is physically separate from the optical scanner. On the other hand, the audio speaker and interface circuit could be resident on an image generating apparatus that also incorporates the optical scanner. Of course, an all-in-one (AIO) printer could be a form of such an image generating apparatus that incorporates the optical scanner.

With regard to the location as to where the audio information can be stored, the bulk memory device could be resident on the external computer, or perhaps it could be resident on the image generating apparatus that also incorporates the optical scanner itself. Such a data file could comprise an entire scanned data set that may include both image data and audio data. On the other hand, the audio data could be separated out from any image data, and that audio data could be stored as a WAV file or an MP3 file. Regardless as to whether the audio data is separated from any image data, such a data set could also be stored as uncompressed data, lossless compressed data, or lossy compressed data.

In this image scanning and audio playback system, a print engine could of course be added as another component, and an all-in-one printer would be a logical electronic device to provide such a hardware configuration. The scanned image data could not only be stored in RAM memory or in a bulk memory device, but that same scanned image data could be converted into a print job and transferred to a print engine for "recording" or printing as a hard-copy printout on a sheet of print media. In this configuration, at least a portion of the hard-copy printout would be representative of the audio information that was originally contained on the sheet scanned by the optical scanner. As an alternative, the print engine could receive a sound file from an external computer, instead of from the optical scanner. In this alternative hardware configuration, the external computer transfers the sound file over a communications data link, such as a parallel interface or a USB interface. Once the sound file is received by the all-in-one printer, the audio data is converted into a print job (along with any image data that would also be part of this print job), and this print job is then transferred to the print engine for printing (or "recording") as a hard-copy printout on a sheet of print media. At least a portion of the hard-copy printout is representative of the audio data that was contained in the sound file received from the external computer.

In any of the systems described above that include an optical scanner and an audio speaker, such a system could provide an automatic playback mode in which the originating hard-copy image is scanned by the optical scanner and, upon a user command, the audio data is then automatically played on the audio speaker. The automatic playback mode will commence after a manual action is performed by the user, such as depressing a "Start" key on the op-panel of the optical scanner or on an operator panel of an all-in-one printer. This automatic playback mode could terminate after a predetermined time period, as selected by the user before commencing the automatic playback mode. As an alternative, a different predetermined period of time could be used which is automatically determined by the amount of audio information that is contained on the sheet of print media that was scanned by the optical scanner. A third method for terminating the automatic playback mode would be, of course, a second manual action by the user, in which he or she depresses a "Stop" key located on the op-panel of the optical scanner or AIO printer.

Another alternative configuration using the present invention could be one in which, a microphone and an image forming apparatus are provided, in which the image forming apparatus includes a print engine of one type or another (such as found in a laser printer or in an ink jet printer). The microphone receives sound waves, which are then converted into an audio-frequency electrical signal that runs through an input interface circuit, where it is signal-conditioned as well as converted into a digital format (such as by an analog-to-digital converter). Once the audio data has been converted into a digital format, it would be easy to use a processing circuit to receive this audio data and to at least temporarily store it in a memory circuit, such as RAM. Alternatively, the audio data could be stored in a bulk memory device, such as a hard disk drive or an optical memory device (e.g., a read/write CD-ROM memory).

When used with the present invention, the audio data received through the microphone and interface circuit is then converted into a print job, which could also contain some image data if desired by the user. Whether there is image data or not, the audio data is converted into a predetermined reproduction format and then printed by the print engine on a sheet of print media, thereby forming a hard-copy printout. At least a portion of this hard-copy printout is representative of the sound waves received by the microphone.

When used in the present invention, the microphone and interface circuit could be resident on a computer device (such as PC) that is physically separate from the print engine or printer. Alternatively, the microphone and interface circuit could be resident on the image forming-apparatus that also incorporates the print engine, and this could be arranged on an AIO printer, such as that described above.

With regard to the physical location for storing the audio data received via the microphone, it could be temporarily stored in RAM, as noted above. Alternatively, it could be stored in a bulk memory device that is resident on the image forming apparatus, or on a different bulk memory device that is resident on an external computer. When stored in a bulk memory device, the audio data could be stored in a file format as uncompressed data, lossless compressed data, or lossy compressed data. If this is being stored as a print job, then both audio data and image data could be stored in any of these three formats. On the other hand, if the audio data is separated from any image data, then that audio data could be stored as a WAV file or as an MP3, for example.

Of course, the sound recording and image forming system described above could be combined with an optical scanner that generates a data signal after scanning a sheet of hard-copy media, and this data signal could contain audio information as described above. The processing circuit converts the scanned data signal into a new signal that comprises a print job, after which the print job signal is transferred to the print engine for "recording" (or printing) as a hard-copy printout on a sheet of print media. In this circumstance, at least a portion of the hard-copy printout would be representative of audio information received through the scanner, so long as the scanner was used to scan a sheet of hard-copy media that contained some type of audio format information in the first place. Another option is to append additional audio information received either through the microphone, or through the optical scanner, after it scans either a further portion of the first sheet of hard-copy image information, or from a second sheet of such hard-copy image information. This append function could be used to add further audio information on a single sheet of hard-copy printout sheet media or, if desired, it could be added in a manner that would cause the audio information to "spill over" onto a second or even a third (or further) sheet of print media.

In all cases described above that include a print engine and a microphone, the sound recording and image forming system could provide an automatic record mode that records received sound waves through the microphone, and automatically creates a hard-copy printout. This mode can commence upon a manual action performed by a user, such as pressing a "Start" key on the op-panel of a printer. This automatic record mode could terminate in several different ways, such as the following:

(1) It could terminate after a predetermined period of time, as selected in advance by the user.

(2) The automatic record mode could terminate after a different predetermined period of time, and in this case the predetermined period of time is determined automatically by determining the amount of physical space that remains available upon a sheet of print media, onto which the audio information is to be placed by the print engine. Of course, if multiple sheets of print media can be used, then this second predetermined period of time could be essentially "infinite" (limited only by the paper supply, memory size, and processing speed).

(3) The automatic record mode could, of course, be terminated manually by action of the user, such as pressing a "Stop" key on the op-panel of the printer.

(4) Finally, the automatic record mode could be terminated by a lack of sound waves of a predetermined minimum audio level being received at the microphone. If desired, the automatic record mode could both start and stop upon voice activation, using well-known electronic circuits. In that manner, once the automatic record mode is initially selected by the user, the actual recording process could start and stop as desired, merely by the user talking.

Many other alternative playback and record modes could be implemented using the principles of the present invention. Some of the basic circuits described above could be used, although in some cases (as noted above), not every physical element would be required to implement some of the features in those configurations described above.

It will be understood that the term "print media" herein refers to a sheet or roll of material that has toner or some other "printable" material applied thereto by a print engine, such as that found in a laser printer, or other type of electrophotographic printer. Alternatively, the print media represents a sheet or roll of material that has ink or some other "printable" material applied thereto by a print engine or printhead, such as that found in an ink jet printer, or which is applied by another type of printing apparatus that projects a solid or liquified substance of one or more colors from nozzles or the like onto the sheet or roll of material. Print media is sometimes referred to as "print medium," and both terms have the same meaning with regard to the present invention, although the term print media is typically used in this patent document. Print media can represent a sheet or roll of plain paper, bond paper, transparent film (often used to make overhead slides, for example), or any other type of printable sheet or roll material.

It will be understood that the logical operations performed by the hardware illustrated in the drawings can be implemented using sequential logic, such as by using microprocessor technology, or using a logic state machine, or perhaps by discrete logic; it even could be implemented using parallel processors. The preferred embodiment uses a microcontroller (e.g., microcontroller 490) to execute software instructions that are stored in memory cells within an EEPROM or "standard" ROM. In fact, the entire microcontroller 490 is contained within ASIC 200 in the preferred mode of the present invention. Of course, other circuitry could be used to implement these logical operations without departing from the principles of the present invention.

It will be further understood that the precise logical and mathematical operations, and conversion operations, discussed hereinabove could be somewhat modified to perform similar, although not exact, functions without departing from the principles of the present invention. The exact nature of some of the decision steps and other commands in these flow charts are directed toward specific models of printer systems (those using Lexmark printers, for example) and certainly similar, but somewhat different, steps would be taken for use with other types of printing systems in many instances, with the overall inventive results being the same.

It will also be understood that the term "print engine" as used in the claims refers to (a) classical print engines with a rotating faceted mirror and a photoconductive member as used in laser printers, or (b) a printhead device with ink nozzles that is transported by a reciprocating carrier as used in ink jet printers, or (c) a thermal image-forming "head" used in thermal printers with special thermal-activated paper, or (d) a daisy wheel mounted on a reciprocating carrier, or (e) a dot matrix head mounted on a reciprocating carrier; or (f) virtually any other type of image forming device.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The invention claimed is:

1. A sound recording and image forming system, comprising:
   a memory circuit for storage of data; a print engine that applies printing material to sheets of print media that are pre-cut to a predetermined size and fed to said print engine as needed upon the occurrence of a print job; a microphone; an interface circuit; and at least one processing circuit that is configured to control a flow of data: (a) from said interface circuit, and (b) between said print engine and said memory circuit; wherein:
   said microphone generates an audio-frequency signal from received sound waves;
   said interface circuit receives and converts said audio-frequency signal generated by said microphone into a digitized first data signal, wherein at least a portion of said digitized first data signal comprises information representative of said received sound waves in a form that can be stored in said memory circuit; and
   said at least one processing circuit is further configured: (c) to receive said digitized first data signal from said interface circuit, (d) to convert said digitized first data signal into a second data signal comprising a print job that includes information representative of said received sound waves, and (e) to transfer said second data signal to said print engine for recording as a hard-copy printout upon said print media, in which at least a portion of said hard-copy printout is representative of said received sound waves, wherein
   (a) said portion of said hard-copy printout that is representative of said received sound waves comprises encoded dot patterns that do not form text characters, but instead said encoded dot patterns correspond to the received sound waves without regard to whether or not the received sound waves form spoken words; and
   (b) said encoded dot patterns that correspond to the received sound waves are printed on a surface area of said print media that does not contain other image data that is to be viewed by a person.

2. The system as recited in claim 1, wherein said microphone and said interface circuit are one of: (a) resident on a computer device that is physically separate from said print engine; and (b) resident on an image forming apparatus which also incorporates said print engine.

3. The system as recited in claim 1, wherein said system provides an automatic record mode that records said received sound waves and automatically creates said hard-copy printout, said mode commencing upon a first manual action performed by a user and terminating upon one of the following events:
 (a) after a first predetermined period of time, as selectable in advance by said user;
 (b) after a second predetermined period of time, as automatically determined by an amount of physical space that remains available upon one of said sheets of print media;
 (c) upon a second manual action by said user; and
 (d) upon a lack of received sound waves of a predetermined minimum audio level for a third predetermined time period.

4. The system as recited in claim 3, wherein said second predetermined period of time is graphically displayed in a graphic preview mode of operation.

5. The system as recited in claim 1, wherein said system stores one of said first data signal and said second data signal as a file in one of: (a) said memory circuit; (b) a first bulk memory device that is resident on an image forming apparatus that also contains said print engine; and (c) a second bulk memory device that is resident on an external computer.

6. The system as recited in claim 5, wherein said file comprises one of: (a) uncompressed data; (b) lossless compressed data; (c) lossy compressed data; (c) a WAV file, and (d) an MP3 file.

7. A sound recording and image forming system, comprising:
 a memory circuit for storage of data; a print engine; a microphone; an interface circuit; and at least one processing circuit that is configured to control a flow of data: (a) from said interface circuit, and (b) between said print engine and said memory circuit; wherein:
 said microphone generates an audio-frequency signal from received sound waves;
 said interface circuit receives and converts said audio-frequency signal generated by said microphone into a first data signal, wherein at least a portion of said first data signal comprises information representative of said received sound waves; and
 said at least one processing circuit is further configured: (c) to receive said first data signal from said interface circuit, (d) to convert said first data signal into a second data signal comprising a print job, and (e) to transfer said second data signal to said print engine for recording as a hard-copy printout upon a print media, in which at least a portion of said hard-copy printout is representative of said received sound waves; and
 an optical scanner that generates a third data signal from scanning a sheet of hard-copy media, wherein:
 at least a portion of image information on said hard-copy media comprises audio information;
 at least a portion of said third data signal is representative of said audio information; and
 said at least one processing circuit is further configured for one of: (f) to convert said third data signal into a fourth data signal comprising a print job, and to transfer said fourth data signal to said print engine for recording as a hard-copy printout upon a print media, in which at least a portion of said hard-copy printout is representative of said audio information; and (g) to store one of said third data signal and said fourth data signal as a file in a bulk memory device, wherein said file comprises one of: (i) uncompressed data; (ii) lossless compressed data; (iii) lossy compressed data; (iv) a WAV file, and (v) an MP3 file.

8. A sound recording and image forming system, comprising:
 a memory circuit for storage of data; a print engine that applies printing material to sheets of print media that are pre-cut to a predetermined size and fed to said print engine as needed upon the occurrence of a print job; a microphone; an interface circuit; and at least one processing circuit that is configured to control a flow of data: (a) from said interface circuit, and (b) between said print engine and said memory circuit; wherein:
 said microphone generates an audio-frequency signal from received sound wares;
 said interface circuit receives and converts said audio-frequency signal generated by said microphone into a first data signal, wherein at least a portion of said first data signal comprises information representative of said received sound waves; and
 said at least one processing circuit is further configured: (c) to receive said first data signal from said interface circuit, (d) to convert said first data signal into a second data signal comprising a print job, (e) to transfer said second data signal to said print engine for recording as a hard-copy printout upon a print media, in which at least a portion of said hard-copy printout is representative of said received sound waves; (f) to receive an additional audio-frequency signal from said microphone; (g) to convert said additional audio-frequency signal and to automatically append said additional audio-frequency signal as a further portion of said second data signal; and (h) to record said further portion of said second data signal as part of said hard-copy printout.

9. The system as recited in claim 8, wherein a maximum amount of remaining recording time is graphically displayed in a graphic preview mode of operation, based upon an amount of physical space that remains available upon said hard-copy printout.

10. The system as recited in claim 7, wherein said microphone and said interface circuit are one of: (a) resident on a computer device that is physically separate from said print engine; and (b) resident on an image forming apparatus which also incorporates said print engine.

11. The system as recited in claim 7, wherein said system provides an automatic record mode that records said received sound waves and automatically creates said hard-copy printout, said mode commencing upon a first manual action performed by a user and terminating upon one of the following events:
 (a) after a first predetermined period of time, as selectable in advance by said user;
 (b) after a second predetermined period of time, as automatically determined by an amount of physical space that remains available upon one of said sheets of print media;
 (c) upon a second manual action by said user; and
 (d) upon a lack of received sound waves of a predetermined minimum audio level for a third predetermined time period.

12. The system as recited in claim 11, wherein said second predetermined period of time is graphically displayed in a graphic preview mode of operation.

13. The system as recited in claim 8, wherein said microphone and said interface circuit are one of: (a) resident on a computer device that is physically separate from said print engine; and (b) resident on an image forming apparatus which also incorporates said print engine.

14. The system as recited in claim 8, wherein said system provides an automatic record mode that records said received sound waves and automatically creates said hard-copy printout, said mode commencing upon a first manual action performed by a user and terminating upon one of the following events:
 (a) after a first predetermined period of time, as selectable in advance by said user;
 (b) after a second predetermined period of time, as automatically determined by an amount of physical space that remains available upon one of said sheets of print media;
 (c) upon a second manual action by said user; and
 (d) upon a lack of received sound waves of a predetermined minimum audio level for a third predetermined time period.

15. The system as recited in claim 13, wherein said second predetermined period of time is graphically displayed in a graphic preview mode of operation.

16. The system as recited in claim 8, wherein said system stores one of said first data signal and said second data signal as a file in one of: (a) said memory circuit; (b) a first bulk memory device that is resident on an image forming apparatus that also contains said print engine; and (c) a second bulk memory device that is resident on an external computer.

17. The system as recited in claim 16, wherein said file comprises one of: (a) uncompressed data; (b) lossless compressed data; (c) lossy compressed data; (c) a WAV file, and (d) an MP3 file.

* * * * *